(12) United States Patent
Koehler et al.

(10) Patent No.: US 9,861,940 B2
(45) Date of Patent: Jan. 9, 2018

(54) ADDITIVES FOR SALT REJECTION ENHANCEMENT OF A MEMBRANE

(71) Applicant: LG NANOH2O, INC., El Segundo, CA (US)

(72) Inventors: Jeff Koehler, Pasadena, CA (US); Alexis Foster, Los Angeles, CA (US); Keunwon Song, Torrance, CA (US); Youngju Lee, Daejon (KR); Chongkyu Shin, Rancho Palos Verdes, CA (US)

(73) Assignee: LG BABOH2O, INC., El Segundo, CA (US)

( * ) Notice: Subject to any disclaimer, the term of this patent is extended or adjusted under 35 U.S.C. 154(b) by 175 days.

(21) Appl. No.: 14/841,223

(22) Filed: Aug. 31, 2015

(65) Prior Publication Data

US 2017/0056840 A1    Mar. 2, 2017

(51) Int. Cl.
   *B01D 69/12*     (2006.01)
   *B01D 71/56*     (2006.01)
   (Continued)

(52) U.S. Cl.
   CPC ........... *B01D 69/125* (2013.01); *B01D 69/02* (2013.01); *B01D 71/56* (2013.01); *B01D 61/002* (2013.01);
   (Continued)

(58) Field of Classification Search
   None
   See application file for complete search history.

(56) References Cited

U.S. PATENT DOCUMENTS

| 3,133,132 A | 5/1964 | Loeb et al. |
| 3,133,137 A | 5/1964 | Loeb et al. |
| (Continued) | | |

FOREIGN PATENT DOCUMENTS

| CA | 2388500 | 4/2001 |
| CA | 2600481 | 9/2006 |
| (Continued) | | |

OTHER PUBLICATIONS

STN Search report—Nov. 23, 2016.*
(Continued)

*Primary Examiner* — Krishnan S Menon
(74) *Attorney, Agent, or Firm* — Dentons US LLP

(57) ABSTRACT

Provided is an interfacial polymerization process for preparation of a thin film composite membrane, which can be used for nanofiltration, forward osmosis, or reverse osmosis, particularly for use with brackish water or seawater. The process includes contacting a porous support membrane with an aqueous phase containing a polyamine to form a coated support membrane, and applying an organic phase containing a polyfunctional acyl halide to the coated support membrane to interfacially polymerize the polyamine and the polyfunctional acyl halide to form a discrimination layer of a thin film composite membrane, where during formation of the membrane, the polyfunctional acyl halide is purified in situ by removal of hydrolyzed acyl halide through addition of a salt rejection-enhancing additive that includes a biguanide compound, dicarbonate compound, pentathiodicarbonate compound, or salt thereof. Also provided are the membranes prepared by the methods and reverse osmosis modules containing the membranes.

15 Claims, 1 Drawing Sheet

(51) Int. Cl.
*B01D 69/02* (2006.01)
*B01D 63/10* (2006.01)
B01D 61/02 (2006.01)
B01D 61/00 (2006.01)

(52) U.S. Cl.
CPC .......... *B01D 61/025* (2013.01); *B01D 61/027* (2013.01); *B01D 63/10* (2013.01); *B01D 2323/40* (2013.01); *B01D 2325/20* (2013.01)

(56) References Cited

U.S. PATENT DOCUMENTS

| | | |
|---|---|---|
| 3,260,691 A | 7/1966 | Lavin et al. |
| 3,351,244 A | 11/1967 | Zandberg et al. |
| 3,367,504 A | 2/1968 | Westmoreland |
| 3,417,870 A | 12/1968 | Bray |
| 3,480,588 A | 11/1969 | Lavin et al. |
| 3,567,632 A | 3/1971 | Richter et al. |
| 3,597,393 A | 8/1971 | Bach et al. |
| 3,615,024 A | 10/1971 | Michaels |
| 3,619,424 A | 11/1971 | Bianchard et al. |
| 3,642,707 A | 2/1972 | Frazer |
| 3,648,845 A | 3/1972 | Riley |
| 3,663,510 A | 5/1972 | Peterson |
| 3,687,842 A | 8/1972 | Credali et al. |
| 3,690,811 A | 9/1972 | Horning |
| 3,692,740 A | 9/1972 | Suzuki et al. |
| 3,696,031 A | 10/1972 | Credali et al. |
| 3,710,945 A | 1/1973 | Dismore |
| 3,744,642 A | 7/1973 | Scala et al. |
| 3,791,526 A | 2/1974 | Stana et al. |
| 3,878,109 A | 4/1975 | Ikeda et al. |
| 3,904,519 A | 9/1975 | McKinney et al. |
| 3,906,250 A | 9/1975 | Loeb |
| 3,920,612 A | 11/1975 | Stephens |
| 3,926,798 A | 12/1975 | Cadotte |
| 3,951,815 A | 4/1976 | Wrasidlo |
| 3,993,625 A | 11/1976 | Kurihara et al. |
| 3,996,318 A | 12/1976 | Van Heuven |
| 4,005,012 A | 1/1977 | Wrasidlo |
| 4,020,142 A | 4/1977 | Davis et al. |
| 4,039,440 A | 8/1977 | Cadotte |
| 4,048,144 A | 9/1977 | Stephens |
| 4,051,300 A | 9/1977 | Klein et al. |
| 4,060,488 A | 11/1977 | Hoover et al. |
| 4,092,424 A | 5/1978 | Brandi et al. |
| 4,188,418 A | 2/1980 | Livingston |
| 4,214,994 A | 7/1980 | Kitano et al. |
| 4,244,824 A | 1/1981 | Lange et al. |
| 4,259,183 A | 3/1981 | Cadotte |
| 4,277,344 A | 7/1981 | Cadotte |
| 4,337,154 A | 6/1982 | Fukuchi et al. |
| 4,387,024 A | 6/1983 | Kurihara et al. |
| 4,388,189 A | 6/1983 | Kawaguchi et al. |
| 4,392,960 A | 7/1983 | Kraus et al. |
| 4,492,721 A | 1/1985 | Joosten et al. |
| 4,559,139 A | 12/1985 | Uemura et al. |
| 4,567,009 A | 1/1986 | Badenhop et al. |
| 4,606,943 A | 8/1986 | Rak et al. |
| 4,693,985 A | 9/1987 | Degen et al. |
| 4,707,266 A | 11/1987 | Degen et al. |
| 4,713,438 A | 12/1987 | Harris et al. |
| 4,740,219 A | 4/1988 | Kulprathipanja et al. |
| 4,754,016 A | 6/1988 | Ai et al. |
| 4,762,619 A | 8/1988 | Gaddis et al. |
| 4,765,897 A | 8/1988 | Cadotte et al. |
| 4,765,915 A | 8/1988 | Diehl |
| 4,769,148 A | 9/1988 | Fibiger et al. |
| 4,778,596 A | 10/1988 | Linder et al. |
| 4,795,559 A | 1/1989 | Shinjou et al. |
| 4,814,082 A | 3/1989 | Wrasidlo |
| 4,830,885 A | 5/1989 | Tran et al. |
| 4,833,014 A | 5/1989 | Linder et al. |
| 4,840,977 A | 6/1989 | Criyello et al. |
| 4,842,736 A | 6/1989 | Bray et al. |
| 4,855,048 A | 8/1989 | Tang et al. |
| 4,859,384 A | 8/1989 | Fibiger et al. |
| 4,872,984 A | 10/1989 | Tomaschke |
| 4,902,424 A | 2/1990 | Wrasidlo |
| 4,911,844 A | 3/1990 | Linder et al. |
| 4,931,362 A | 6/1990 | Zaifkovits et al. |
| 4,948,506 A | 8/1990 | Lonsdale et al. |
| 4,948,507 A | 8/1990 | Tomaschke |
| 4,950,404 A | 8/1990 | Chau |
| 4,971,697 A | 11/1990 | Douden et al. |
| 4,983,291 A | 1/1991 | Chau et al. |
| 5,002,590 A | 3/1991 | Friesen et al. |
| 5,017,680 A | 5/1991 | Sublett |
| 5,019,261 A | 5/1991 | Stengaard |
| 5,024,594 A | 6/1991 | Athayde et al. |
| 5,028,337 A | 7/1991 | Linder et al. |
| 5,032,268 A | 7/1991 | Hahn |
| 5,069,945 A | 12/1991 | Wrasidlo |
| 5,084,179 A | 1/1992 | Knight |
| 5,089,460 A | 2/1992 | Chien |
| 5,091,086 A | 2/1992 | Stengaard |
| 5,096,584 A | 3/1992 | Reddy et al. |
| 5,098,575 A | 3/1992 | Yaeli |
| 5,104,632 A | 4/1992 | Douden et al. |
| 5,108,607 A | 4/1992 | Kraus et al. |
| 5,114,582 A | 5/1992 | Sandstrom et al. |
| 5,130,025 A | 7/1992 | Lefebvre et al. |
| 5,147,541 A | 9/1992 | McDermott, Jr. et al. |
| 5,154,829 A | 10/1992 | Degen et al. |
| 5,160,617 A | 11/1992 | Huis In't Veld et al. |
| 5,160,673 A | 11/1992 | Wollbeck et al. |
| 5,173,189 A | 12/1992 | Hoshi et al. |
| 5,183,566 A | 2/1993 | Darnell et al. |
| 5,190,654 A | 3/1993 | Bauer |
| 5,234,598 A | 8/1993 | Tran et al. |
| 5,254,261 A | 10/1993 | Tomaschke et al. |
| 5,258,203 A | 11/1993 | Arthur |
| 5,262,054 A | 11/1993 | Wheeler |
| 5,269,926 A | 12/1993 | Webster et al. |
| 5,281,430 A | 1/1994 | Herron et al. |
| 5,342,431 A | 8/1994 | Anderson et al. |
| 5,376,442 A | 12/1994 | Davidson et al. |
| 5,435,957 A | 7/1995 | Degen et al. |
| 5,462,667 A | 10/1995 | Wollinsky et al. |
| 5,484,528 A | 1/1996 | Yagi et al. |
| 5,538,642 A | 7/1996 | Solie |
| 5,543,046 A | 8/1996 | Van Rijn |
| 5,576,057 A | 11/1996 | Hirose et al. |
| 5,614,099 A | 3/1997 | Hirose et al. |
| 5,650,479 A | 7/1997 | Glugla et al. |
| 5,658,460 A | 8/1997 | Cadotte et al. |
| 5,681,467 A | 10/1997 | Solie et al. |
| 5,681,473 A | 10/1997 | Miller et al. |
| 5,693,227 A | 12/1997 | Costa |
| 5,733,602 A | 3/1998 | Hirose et al. |
| 5,755,964 A | 5/1998 | Mickols |
| 5,783,079 A | 7/1998 | Kumano et al. |
| 5,800,706 A | 9/1998 | Fischer |
| 5,843,351 A | 12/1998 | Hirose et al. |
| 5,876,602 A | 3/1999 | Jons et al. |
| 5,914,039 A | 6/1999 | Mahendran et al. |
| 5,919,026 A | 7/1999 | Appleton |
| 5,938,934 A | 8/1999 | Balogh et al. |
| 5,989,426 A | 11/1999 | Hirose et al. |
| 6,015,495 A | 1/2000 | Koo et al. |
| 6,024,872 A | 2/2000 | Mahendran et al. |
| 6,024,873 A | 2/2000 | Hirose et al. |
| 6,117,341 A | 9/2000 | Bray et al. |
| 6,153,133 A | 11/2000 | Kaimai et al. |
| 6,156,680 A | 12/2000 | Goettmann |
| 6,156,867 A | 12/2000 | Aoyama et al. |
| 6,162,358 A | 12/2000 | Li et al. |
| 6,171,497 B1 | 1/2001 | Hirose et al. |
| 6,177,011 B1 | 1/2001 | Hachisuka et al. |
| 6,185,940 B1 | 2/2001 | Prueitt |
| 6,187,192 B1 | 2/2001 | Johnston et al. |
| 6,241,893 B1 | 6/2001 | Levy |
| 6,245,234 B1 | 6/2001 | Koo et al. |
| 6,277,282 B1 | 8/2001 | Kihara et al. |

(56) References Cited

U.S. PATENT DOCUMENTS

| | | |
|---|---|---|
| 6,284,137 B1 | 9/2001 | Hajikano et al. |
| 6,309,546 B1 | 10/2001 | Hermann et al. |
| 6,337,018 B1 | 1/2002 | Mickols |
| 6,368,507 B1 | 4/2002 | Koo et al. |
| 6,391,205 B1 | 5/2002 | McGinnis |
| 6,406,626 B1 | 6/2002 | Murakami et al. |
| 6,413,425 B1 | 7/2002 | Haschisuka et al. |
| 6,425,936 B1 | 7/2002 | Sammons et al. |
| 6,472,016 B1 | 10/2002 | Soria et al. |
| 6,540,915 B2 | 4/2003 | Patil |
| 6,551,536 B1 | 4/2003 | Kwak et al. |
| 6,562,266 B2 | 5/2003 | Mickols |
| 6,582,495 B2 | 6/2003 | Chau et al. |
| 6,585,802 B2 | 7/2003 | Koros et al. |
| 6,605,140 B2 | 8/2003 | Guiver et al. |
| 6,652,751 B1 | 11/2003 | Kutowy et al. |
| 6,710,017 B2 | 3/2004 | Unhoch |
| 6,723,241 B2 | 4/2004 | Mickols |
| 6,753,396 B2 | 6/2004 | Ulbricht et al. |
| 6,755,900 B2 | 6/2004 | Koros et al. |
| 6,821,430 B2 | 11/2004 | Andou et al. |
| 6,837,996 B2 | 1/2005 | Kurth et al. |
| 6,841,075 B2 | 1/2005 | Penth et al. |
| 6,841,601 B2 | 1/2005 | Serpico et al. |
| 6,878,278 B2 | 4/2005 | Mickols |
| 6,890,436 B2 | 5/2005 | Komatsu et al. |
| 6,881,336 B2 | 8/2005 | Johnson |
| 7,018,538 B2 | 3/2006 | Leiser et al. |
| 7,048,855 B2 | 5/2006 | de la Cruz |
| 7,109,140 B2 | 9/2006 | Marand et al. |
| 7,138,058 B2 | 11/2006 | Kurth et al. |
| 7,182,894 B2 | 2/2007 | Kumar et al. |
| 7,211,320 B1 | 5/2007 | Cooper et al. |
| 7,311,982 B2 | 12/2007 | Christou et al. |
| 7,459,121 B2 | 12/2008 | Liang et al. |
| 7,490,725 B2 | 2/2009 | Pinnau et al. |
| 7,491,334 B2 | 2/2009 | Comstock |
| 7,494,963 B2 | 2/2009 | Ahmed et al. |
| 7,501,027 B2 | 3/2009 | Ahmed et al. |
| 7,511,006 B2 | 3/2009 | Shimmin et al. |
| 7,537,776 B1 | 5/2009 | Beilfuss et al. |
| 7,560,421 B2 | 7/2009 | Nakada et al. |
| 7,569,212 B2 | 8/2009 | Wagenaar |
| 7,604,746 B2 | 10/2009 | Childs et al. |
| 7,871,522 B2 | 1/2011 | Stover et al. |
| 7,955,656 B2 | 6/2011 | Murayama et al. |
| 8,002,989 B2 | 8/2011 | McGinnis |
| 8,011,517 B2 | 9/2011 | Allen et al. |
| 8,017,050 B2 | 9/2011 | Freeman et al. |
| 8,147,735 B2 | 4/2012 | Buschmann |
| 8,163,814 B2 | 4/2012 | Emrick et al. |
| 8,177,978 B2 | 5/2012 | Kurth et al. |
| 8,443,986 B2 | 5/2013 | Tanaka et al. |
| 8,505,743 B2 | 8/2013 | Sarkar et al. |
| 8,505,745 B2 | 8/2013 | Mayes et al. |
| 8,507,612 B2 | 8/2013 | Zhu |
| 8,551,388 B2 | 10/2013 | Chalker et al. |
| 8,567,612 B2 | 10/2013 | Kurth et al. |
| 8,580,341 B2 | 11/2013 | Wang et al. |
| 8,603,340 B2 | 12/2013 | Kurth et al. |
| 8,754,139 B2 | 6/2014 | Allen et al. |
| 8,801,635 B2 | 8/2014 | Hovorka |
| 8,801,935 B2* | 8/2014 | Koehler .............. B01D 67/0079 210/490 |
| 9,022,227 B2 | 5/2015 | Na et al. |
| 2002/0074282 A1 | 6/2002 | Herrmann et al. |
| 2002/0187401 A1 | 12/2002 | Lee et al. |
| 2003/0116498 A1 | 6/2003 | Mickols |
| 2003/0116503 A1 | 6/2003 | Wang et al. |
| 2003/0121844 A1 | 7/2003 | Koo et al. |
| 2003/0132174 A1 | 7/2003 | Isomura et al. |
| 2004/0178135 A1 | 9/2004 | Beplate |
| 2004/0234751 A1 | 11/2004 | Sakurai et al. |
| 2005/0077243 A1 | 4/2005 | Pinneau et al. |
| 2005/0139066 A1 | 6/2005 | Miller et al. |
| 2005/0145568 A1 | 7/2005 | McGinnis |
| 2005/0173341 A1 | 8/2005 | Salinaro |
| 2005/0230305 A1 | 10/2005 | Kulkami et al. |
| 2006/0062902 A1 | 3/2006 | Sager et al. |
| 2006/0063911 A1 | 3/2006 | Cayton et al. |
| 2006/0065598 A1* | 3/2006 | Comstock .............. B01D 65/02 210/639 |
| 2006/0175256 A1 | 8/2006 | Masten et al. |
| 2006/0201884 A1 | 9/2006 | Kulprathipanja et al. |
| 2006/0204812 A1 | 9/2006 | Moriyama et al. |
| 2006/0249447 A1 | 11/2006 | Yeager |
| 2007/0272628 A1 | 11/2007 | Mickols et al. |
| 2008/0149561 A1 | 6/2008 | Chu et al. |
| 2008/0237126 A1 | 10/2008 | Hoek et al. |
| 2008/0251447 A1 | 10/2008 | Koumoto et al. |
| 2008/0295951 A1 | 12/2008 | Hiro et al. |
| 2009/0050558 A1 | 2/2009 | Ishizuka et al. |
| 2009/0159527 A1 | 6/2009 | Mickols et al. |
| 2009/0272692 A1 | 11/2009 | Kurth et al. |
| 2010/0006495 A1 | 1/2010 | Buschmann |
| 2010/0025330 A1 | 2/2010 | Ratto et al. |
| 2010/0044902 A1 | 2/2010 | Ohara et al. |
| 2010/0051538 A1 | 3/2010 | Freeman et al. |
| 2010/0062156 A1 | 3/2010 | Kurth et al. |
| 2010/0193428 A1 | 8/2010 | Hane et al. |
| 2011/0031180 A1 | 2/2011 | Tada et al. |
| 2011/0155660 A1 | 6/2011 | Mickols et al. |
| 2011/0174728 A1 | 7/2011 | Eisen et al. |
| 2011/0189469 A1* | 8/2011 | Stenzel ................ B01D 69/125 428/315.5 |
| 2012/0048798 A1 | 3/2012 | Cheng et al. |
| 2012/0111791 A1 | 5/2012 | Freeman et al. |
| 2012/0285890 A1 | 11/2012 | Koehler et al. |
| 2012/0292249 A1 | 11/2012 | Wang et al. |
| 2013/0284664 A1 | 10/2013 | Takagi et al. |
| 2013/0287946 A1 | 10/2013 | Jons et al. |
| 2014/0014575 A1 | 1/2014 | Kwon et al. |
| 2014/0050846 A1 | 2/2014 | Kurth et al. |
| 2015/0107455 A1 | 4/2015 | Mayer et al. |

FOREIGN PATENT DOCUMENTS

| | | | |
|---|---|---|---|
| CN | 101695636 | | 4/2010 |
| CN | 101816900 | | 9/2010 |
| CN | 102380318 A | * | 3/2012 |
| EP | 0348041 | | 12/1989 |
| JP | 63-012310 | | 1/1988 |
| JP | 04-126529 | | 4/1992 |
| JP | 05-245349 | | 9/1993 |
| JP | H08-182921 | | 7/1996 |
| JP | 2000-225327 | | 8/2000 |
| JP | 2006-187731 | | 7/2006 |
| KR | 1020010100304 | | 11/2001 |
| KR | 1020050077141 | | 8/2005 |
| WO | 2000/076641 | | 12/2000 |
| WO | 2000/078437 | | 12/2000 |
| WO | 2001/078882 | | 10/2001 |
| WO | 2002/004082 | | 1/2002 |
| WO | 2002/015299 | | 2/2002 |
| WO | 2002/051528 | | 7/2002 |
| WO | 2003/047734 | | 6/2003 |
| WO | 2003/097218 | | 11/2003 |
| WO | 2003/097221 | | 11/2003 |
| WO | 2004/022491 | | 3/2004 |
| WO | 2005/014266 | | 2/2005 |
| WO | 2005/023414 | | 3/2005 |
| WO | 2005/057700 | | 6/2005 |
| WO | 2006/030411 | | 3/2006 |
| WO | 2006/098872 | | 9/2006 |
| WO | 2006/135384 | | 12/2006 |
| WO | 2007/001405 | | 1/2007 |
| WO | 2007/024461 | | 3/2007 |
| WO | 2007/035019 | | 3/2007 |
| WO | 2007/050408 | | 5/2007 |
| WO | 2007/065866 | | 6/2007 |
| WO | 2007/084169 | | 7/2007 |
| WO | 2007/095363 | | 8/2007 |
| WO | 2007/133362 | | 11/2007 |
| WO | 2007/133609 | | 11/2007 |

(56) References Cited

FOREIGN PATENT DOCUMENTS

| WO | 2008/057842 | 5/2008 |
|---|---|---|
| WO | 2008/066939 | 6/2008 |
| WO | 2008/091658 | 7/2008 |
| WO | 2008/118228 | 10/2008 |
| WO | 2009/129354 | 10/2009 |
| WO | 2010/123518 | 10/2010 |
| WO | 2011/008549 | 1/2011 |
| WO | 2014/080426 | 5/2014 |
| WO | 2014080426 A1 | 5/2014 |

OTHER PUBLICATIONS

Alexandre et al., "Polymer-layered silicate nanocomposites: preparation, properties and uses of a new class of materials," Materials Science and Engineering, 28 (2000):1-63.
Arthur, "Structure-Property Relationship in a Thin Film Composite Reverse Osmosis Membrane," Journal of Membrane Science, 1989, 46:243-260.
Bae et al., "Preparation of $TiO_2$ self-assembled polymeric nanocomposite membranes and examination of their fouling mitigation effects in a membrane bioreactor system," J. Membrane Science, 266 (2005):1-5.
Bermudez et al, "Infinite Dilution Activity Coefficients in Tributyl Phosphate and Triacetin," J. Chem. Eng. Data, 2000, 45:1105-1107.
Bhattacharyya et al., "An Overview of Selected Membrane Techniques for Environmental Applications," J. Chin. Inst. Chan. Eners., 2002, 33(1):62-66.
Boom et al., "Microstructures in phase inversion membranes. Part 2. The role of a polymeric additive," J. Membrane Science, 73 (1992):277-292.
Cadotte et al., "Advanced Poly (Piperazineamide) Reverse Osmosis Membranes" NTIS: Final Report, 1979, pp. 1-48.
Cadotte et al., "Continued Evaluation of In Situ-Formed Condensation Polymers for Reverse Osmosis Membranes" NTIS: Final Report, 1976, pp. 1-80 (92 pages total).
Cadotte et al., "Research on 'In Situ'-Formed Condensation Polymer for Reverse Osmosis Membranes" NTIS: Final Report, 1978, pp. 1-44 (56 pages total).
Cadotte, J.E., "Evolution of Composite Reverse Osmosis Membranes," Materials Science of Synthetic Membranes, 1985, pp. 273-294.
Camblor et al. "Characterization of nanocrystalline zeolite Beta," Microporous and Mesoporous Materials, 1998, 25(1-3):59-74.
Chui, et al. "A Chemically Functionalizable Nanoporous Material [Cu3(TMA)2(H20)3b," Science, 1999, 283:1148-1150.
Freger et al., "TFC polyamide membranes modified by grafting of hydrophilic polymers: an FT-IR/AFM/TEM study," J. Membrane Science, 209 (2002):283-292.
Goosen et al., "Fouling of Reverse Osmosis and Ultrafiltration Membranes: A Critical Review," Separation Science and Technology, 39(10):2261-2298 (2004).
Hoek et al., "Influence of Crossflow Membrane Filter Geometry and Shear Rate on Colloidal Fouling in Reverse Osmosis and Nanofiltration Separations," Environ. Engineering Science, 19(6):357-372 (2002).
Hoek et al., "Cake-Enhanced Concentration Polarization: A New Fouling Mechanism for Salt-Rejecting Membranes," Environ. Sci. Technol., 37 (2003):5581-5588.
Hoek et al., "Effect of Membrane Surface Roughness on Colloid—Membrane DLVO Interactions," Langmuir, 19 (2003):4836-4847.
Holmberg et al. "Controlling size and yield of zeolite Y nanocrystals using tetramethylammonium bromide," Microporous and Mesoporous Materials, 2003, 59(1):13-28.
Jeong et al., "Interfacial polymerization of thin film nanocomposites: A new concept for reverse osmosis membranes," Journal of Membrane Science, 2007, 294:1-7.
Kang et al., "A Novel Method of Surface Modification on Thin-Film Composite Reverse Osmosis Membrane by Grafting (Ethylene Glycol)" Polymer, 2007, 48(5):1165-1170.
Kang et al., "Direct observation of biofouling in cross-flow microfiltration: mechanisms of deposition and release," J. Membrane Science, 244(1-2):151-165 (2004).
Lau et al., "A recent progress in thin film composite membrane: A review, " Desalination, 287 (2012):190-199.
Lee et al., "Effect of Operating Conditions on CaSO4 Scale Formation Mechanism in Nanofiltration for Water Softening," Wat. Res. 34(15):3854-3866 (2000).
Lemanski et al., "Effect of shell-side flows on the performance of hollow-fiber gas separation modules," J. Membrane Science, 195 (2001):215-228.
Li et al., "Organic Fouling and Chemical Cleaning of Nanofiltration Membranes: Measurements and Mechanisms," Environ. Sci. Technol., 38 (2004):4683-4693.
Lohokare et al., "Effect of Support Material on Ultrafiltration Membrane Performance," J. Applied Polymer Science, 99 (2006):3389-3395.
McDonnell et al., "Hydrophilic and Antimicrobial Zeolite Coatings for Gravity-Independent Water Separation," Adv. Funct. Mater., 15(2):336-340 (2005).
Rong et al., "Structure-property relationships of irradiation grafted nano-inorganic particle filled polypropylene composites," Polymer 42 (2001):167-183.
Rowsell et al., "Metal-organic frameworks: a new class of porous materials," Microporous and Mesoporous Materials, 73 (2004):3-14.
Van et al., "Surface reaction kinetics of metal β-diketonate precursors with O radicals in radical-enhanced atomic layer deposition of metal oxides," Applied Surface Science, 246 (2005):250-261.
Vrijenhoek et al., "Influence of membrane surface properties on initial rate of colloidal fouling of reverse osmosis and nanofiltration membranes," J. Membrane Science, 188 (2001):115-128.
Walker et al., "A Novel Asymmetric Clamping Cell for Measuring Streaming Potential of Flat Surfaces," Langmuir, 18 (2002):2193-2198.
Wang et al., "Formation of semi-permeable polyamide skin layers on the surface of supported liquid membranes," Journal of Membrane Science, 1998, 147:109-116.
Wang et al., "Direct Observation of Microbial Adhesion of Membranes," Environ. Sci. Technol., 39 (2005):6461-6469.
Wei et al., "A novel method of surface modification on thin-film-composite reverse osmosis membrane by grafting hydantoin derivative," J. Membrane Science, 346 (2010):152-162.
Wei et al., "Surface modification of commercial aromatic polyamide reverse osmosis membranes by graft polymerization of 3-allyl-5,5-dimethylhydantoin," J. Membrane Science, 351 (2010):222-233.
Zhu et al., "Colloidal Fouling of Reverse Osmosis Membranes: Measurements and Fouling Mechanisms," Environ. Sci. Technol., 31 (1997):3654-3662.

\* cited by examiner

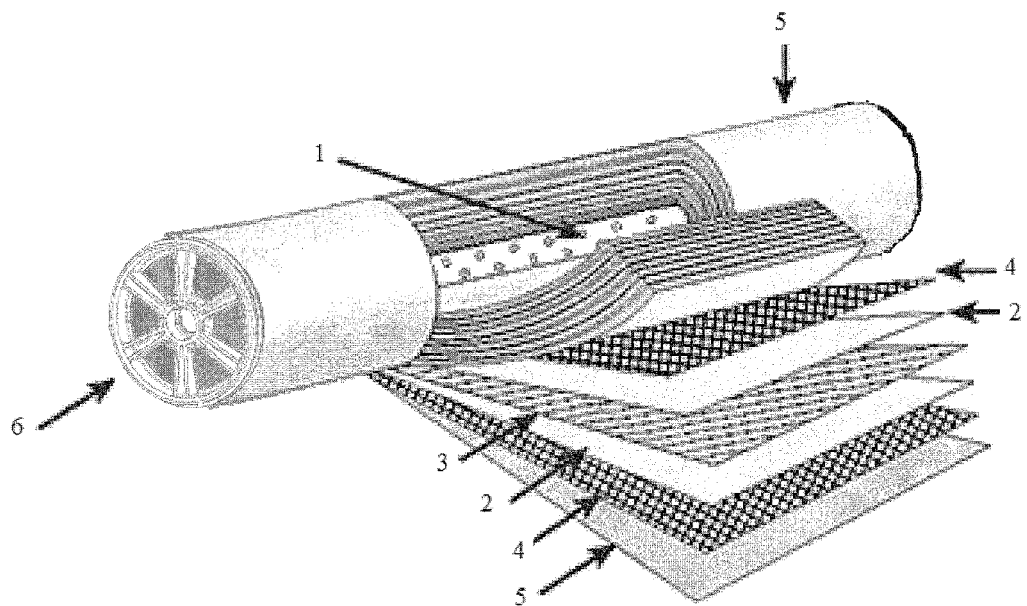

ADDITIVES FOR SALT REJECTION ENHANCEMENT OF A MEMBRANE

FIELD OF THE INVENTION

Provided are thin film composite (TFC) membranes and methods of preparing TFC membranes, including membranes used for nanofiltration, reverse osmosis, and forward osmosis, to purify water, such as tap water, brackish water or seawater, that exhibit high salt rejection. In particular, provided are TFC membranes that are prepared in the presence of a salt rejection-enhancing additive that exhibit enhanced salt rejection as compared to the same membranes prepared in the absence of the salt rejection-enhancing additive.

BACKGROUND

The availability of clean water for use worldwide is shrinking with increasing population and expansion in urbanization and industrialization. While over 70% of the world is water, only about 2.5% is fresh water. To meet the increasing demands for usable fresh water, technologies such as seawater and brackish water desalination have been developed. Because seawater and brackish water contain large amounts of impurities, including salts, minerals, and other dissolved ions, the water must be treated before industrial, agricultural or home use.

Reverse osmosis (RO) membrane desalination uses membrane technology to transform seawater and brackish water into fresh water for drinking, irrigation, and industrial applications by separating dissolved substances, such as salts, minerals and ions, from the water. Reverse osmosis is the process of forcing a solvent from a region of high solute concentration through a membrane to a region of low solute concentration by applying a pressure in excess of the osmotic pressure. This is the reverse of an osmosis process, which is the natural movement of solvent from an area of low solute concentration through a membrane to an area of high solute concentration with no external pressure applied. The membrane here is semipermeable, meaning it allows the passage of solvent but not of solute. RO desalination processes require substantially less energy than do thermal desalination processes, e.g., multi-stage flash; thus, reverse osmosis membrane technology is increasingly used to produce fresh water from seawater or brackish water.

The membranes used for RO are composite membranes made up of a porous support and a thin polyamide layer formed on the support. Typically, the polyamide layer is formed by interfacial polymerization of a polyfunctional amine and a polyfunctional acid halide, creating a dense barrier layer in the polymer matrix where most separation occurs. The membranes are designed to allow only water to pass through this dense layer while preventing the passage of solutes such as salts, minerals and ions. The reverse osmosis process requires that a high pressure be exerted on the high concentration side of the membrane, usually 2-17 bar (30-250 psi) for fresh and brackish water, and 40-70 bar (600-1000 psi) for seawater, which has around 24 bar (350 psi) natural osmotic pressure which must be overcome.

During the interfacial polymerization reaction between the polyfunctional amine and the polyfunctional acid halide, hydrolysis of the polyfunctional acid halide readily occurs. Trimesoyl chloride (TMC) is a polyfunctional acid halide commonly used in the formation of thin film composite (TFC) membranes that has three acyl halide groups that readily hydrolyze in air to mono-hydrolyzed TMC (a molecule of trimesoyl chloride in which one of the —Cl groups has been replaced with an —OH group), with di-hydrolyzed trimesoyl chloride and tri-hydrolyzed trimesoyl chloride (i.e., trimesic acid) often present at low levels. The hydrolysis products of TMC, when incorporated into thin film composite membranes for RO applications, can yield membranes with high flux but can also negatively affect salt rejection characteristics as compared to a membrane made with purified TMC. TMC can be purified prior to use, but unless stringent humidity controls are in place, hydrolysis will continue throughout the interfacial polymerization process.

Thus, there remains a need to develop RO membranes, including TFC membranes, that achieve high rejection characteristics, such as high salt rejection. Also desired are methods for making the membranes. Accordingly, it is among the objects herein to provide RO membranes, including TFC membranes, that achieve high rejection values, particularly with respect to higher concentration salts, and methods for making the membranes.

SUMMARY

Accordingly, the present invention is directed to a thin film composite membrane and process of making a thin film composite membrane that exhibits a high salt rejection value and/or low permeability coefficient (B-value). In particular, during formation of the membrane, the polyfunctional acyl halide is purified in situ by removal of hydrolyzed polyfunctional acyl halide through the addition of a salt rejection-enhancing additive. Because of this purification process, the membranes provided herein exhibit greater salt rejection and decreased salt permeability coefficient values as compared to membranes prepared in the prior art. The present invention substantially obviates one or more of the problems due to limitations and disadvantages of the related art.

In one aspect, a process for preparing a thin film composite membrane is provided, where the process includes providing an aqueous phase containing a polyamine and an organic phase containing a polyfunctional acyl halide; introducing a salt rejection-enhancing additive that is able to form a complex with hydrolyzed polyfunctional acyl halide in the aqueous phase; applying the aqueous phase to a surface of a porous support membrane to form a coated support membrane; applying the organic phase to the coated support membrane to allow interfacial polymerization between the aqueous phase and organic phase, where hydrolyzed and non-hydrolyzed polyfunctional acyl halide are present during interfacial polymerization; forming a complex between the salt rejection-enhancing additive and the hydrolyzed polyfunctional acyl halide and interfacially polymerizing the polyamine and the non-hydrolyzed acyl halide to produce a discrimination layer of a thin film composite membrane containing the porous support membrane and the discrimination layer. In the processes provided herein, the thin film composite membrane exhibits a salt rejection that is greater than the salt rejection of a thin film composite membrane prepared in the absence of the salt rejection-enhancing additive or a permeability coefficient (B-value) that is less than the permeability coefficient of a thin film composite membrane prepared in the absence of the salt rejection-enhancing additive.

In one aspect, processes for the production of TFC membranes having increased salt rejection are provided, where the process includes providing a porous support membrane, and contacting on the porous support membrane a first solution containing a polyamine, such as 1,3-diaminobenzene (i.e., m-phenylenediamine (MPD)), with a second solution containing a polyfunctional acyl halide, e.g., trimesoyl chloride (TMC), where the first solution, the second solution, or both, include a salt rejection-enhancing additive that includes a biguanide compound, dicarbonate compound, pentathiodicarbonate compound, or salts thereof, where when the solutions are contacted, interfacial polymerization between the polyamine and the polyfunctional acid halide forms a discrimination layer on the porous support membrane of a highly permeable thin film composite membrane. The salt rejection-enhancing additive can purify the polyfunctional acyl halide in situ. For example, the salt rejection-enhancing additive can sequester, i.e., remove from reaction, hydrolyzed polyfunctional acyl halide, e.g., mono-hydrolyzed or di-hydrolyzed polyfunctional acyl halide, such as mono- or di-hydrolyzed TMC, thereby reducing the concentration of hydrolyzed polyfunctional acyl halide during interfacial polymerization, resulting in increased crosslinking. The membrane exhibits increased salt rejection characteristics, for example, the membrane is characterized by exhibiting a salt rejection that is greater than the salt rejection of a membrane prepared in the absence of the salt rejection-enhancing additive and/or a salt permeability coefficient (B-value) that is less than the salt permeability coefficient of a membrane prepared in the absence of the additive.

The invention can provide an interfacial polymerization process for preparing a highly permeable TFC membrane, such as an RO membrane, including: contacting on a porous support membrane: a) a first solution containing 1,3-diaminobenzene; and b) a second solution containing trimesoyl chloride, where at least one of solutions a) or b) contains an additive that includes a salt rejection-enhancing additive that is able to remove hydrolyzed TMC. Exemplary embodiments include the use of one or more salt rejection-enhancing additives such as biguanide compound, dicarbonate compound, pentathiodicarbonate compound, or salts thereof, for example, polyalkylene biguanide, polyalkylene dicarbonate, or polyalkylene pentathiodicarbonate compounds or salts thereof, e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt, or is a compound of the formula:

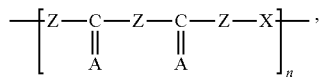

wherein the formula represents a recurring polymer unit; n is a number between 1 and 60, typically between 1 and 30, such as between 10 and 13; Z is a heteroatom such as S, O, or N (in the form of the NH group); A is a heteroatom such as S, O, or N (in the form of the NH group); and, optionally, X, that when present is an alkyl chain having between 1 and 30 carbons, such as between 1 and 15 carbons, for example, between 2 and 8 carbons, e.g., 2, 3, 4, 5, 6, 7, or 8 carbons; and when the solutions are contacted, recovering a highly permeable membrane. In some embodiments, the first solution includes a polar solvent. In some embodiments, the polar solvent includes water. In some embodiments, the first solution is an aqueous solution. In some embodiments, the salt rejection-enhancing additive that includes a biguanide compound, dicarbonate compound, pentathiodicarbonate compound, or salt thereof is in the first solution. In some embodiments, the second solution includes a non-polar organic solvent. In some embodiments, the additive that includes a biguanide compound, dicarbonate compound, pentathiodicarbonate compound, or salt thereof is in the second solution. In some embodiments, one additive is in the first solution and one additive is in the second solution.

In some embodiments, the salt rejection-enhancing additive can have the formula:

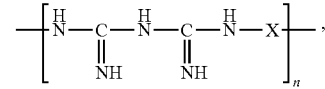

wherein the formula represents a recurring polymer unit; n is a number between 1 and 60; and X is an alkyl chain having between 1 and 30 carbons. In other embodiments, the salt rejection-enhancing additive can have the formula:

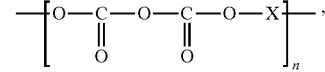

wherein the formula represents a recurring polymer unit; n is a number between 1 and 60; and X is an alkyl chain having between 1 and 30 carbons. In yet other embodiments, the salt rejection-enhancing additive can have the formula:

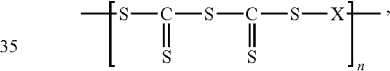

wherein the formula represents a recurring polymer unit; n is a number between 1 and 60; and X is an alkyl chain having between 1 and 30 carbons.

An advantage of the present invention is that the permeable TFC membranes, for example, RO membranes, produced by the provided methods can purify brackish water containing 2,000 ppm or less NaCl or seawater containing 32,000 ppm or less NaCl. For example, modules containing membranes produced using the processes described herein can be used to produce a stream of potable water from seawater at pressures of about 1000 psi or less, such as 800 psi or less.

Additional features and advantages of the invention will be set forth in the description which follows, and in part will be apparent from the description, or may be learned by practice of the invention. The objectives and other advantages of the invention will be realized and attained by the structures particularly pointed out in the written description and claims hereof as well as the appended drawing.

Also provided are processes for preparing a thin film composite membrane, such as a reverse osmosis membrane in which the polyfunctional acyl halide is purified in situ by removal of hydrolyzed polyfunctional acyl halide during the interfacial polymerization process by reacting the hydrolyzed polyfunctional acyl halide with a salt rejection-enhancing additive. An exemplary process includes preparing an aqueous phase containing a polyamine and preparing an organic phase containing a polyfunctional acid halide, where the aqueous phase or organic phase or both further contain a salt rejection-enhancing additive that includes a biguanide compound, dicarbonate compound, pentathiodicarbonate compound, or salt thereof. The process further includes applying the aqueous phase to the surface of a porous support membrane to form a coated support membrane, and applying the organic phase to the coated support membrane to interfacially polymerize the polyamine and the polyfunctional acid halide to form a discrimination layer of a thin film composite membrane, where the membrane includes the porous support membrane and the discrimination layer. The polyfunctional acyl halide includes both hydrolyzed and non-hydrolyzed polyfunctional acyl halide, and the salt rejection-enhancing additive forms a complex with the hydrolyzed polyfunctional acyl halide, thereby removing the hydrolyzed polyfunctional acyl halide from the interfacial polymerization reaction. The discrimination layer can be a composite polyamide membrane prepared by coating a porous support membrane with a polyfunctional amine monomer, most commonly coated from an aqueous phase solution. Although water is a preferred polar solvent, other solvents, such as lower monohydric alcohols, ketones, and acetonitrile can be used. A polyfunctional acid halide subsequently can be applied to the support membrane, typically from an organic phase solution.

In some embodiments, the salt rejection-enhancing additive of the process provided herein can be a biguanide compound, dicarbonate compound, pentathiodicarbonate compound, or salts thereof that is present in the aqueous phase or organic phase in a concentration from about 0.001% to 1% based on the weight of the aqueous phase or organic phase. In some embodiments, the salt rejection-enhancing additive can have the formula:

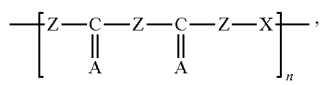

where the formula represents a recurring polymer unit, n is a number between 1 and 60, for example, between 1 and 30, such as between 10 and 13, Z is a heteroatom, for example, S, O, or N (in the form of the NH group), A is a heteroatom, for example, S, O, or N (in the form of the NH group), and, optionally, X, that when present is an alkyl chain having between 1 and 30 atoms, such as between 1 and 15 atoms, for example, between 1 and 10 carbons, for example, X can be —$(CH_2)_6$—. In the process provided herein, the salt rejection-enhancing additive can be selected from among polyalkylene biguanide, a polyalkylene biguanide salt, a polyalkylene dicarbonate, a polyalkylene dicarbonate salt, a polyalkylene pentathiodicarbonate, or a polyalkylene pentathiodicarbonate salt. In some embodiments of the process provided herein, the salt rejection-enhancing additive can be a polyhexamethylene biguanide (PHMB) or a PHMB salt, a polyhexamethylene dicarbonate or a polyhexamethylene dicarbonate salt, a polyhexamethylene pentathiodicarbonate or a polyhexamethylene pentathiodicarbonate salt, polyhexamethylene guanidine phosphate methylene single salt, p-chlorophenyl biguanide, 4-chlorobenzhydryl biguanide, or a halogenated hexidine selected from among chlorhexidine (1,1'-hexamethylene-bis-5-(4-chlorophenyl biguanide) and salts thereof.

In some embodiments, the salt rejection-enhancing compound can be modified or derivatized with other functional groups, such as hydroxy, amine, halogen, epoxy, alkyl or alkoxy silyl functionalities to enable direct immobilization to a surface. In other embodiments, the salt rejection-enhancing compound can be the free base or can be the salt, including salts with an inorganic acid, such as hydrochloride, hydrofluoride, nitrate, sulfate and/or phosphate, and/or salts with an organic acid, such as carboxylic acid (carbonate), acetate, benzoate, tartrate, adipate, lactate, formate, maleate, glutamate, ascorbate, citrate, gluconate, oxalate, succinate, pamoate, salicylate, isethionate, succinimate, mono-diglycolate, dimethanesulfonate, di-isobutyrate, and/or glucoheptonate, or can be in an aqueous solution.

In some embodiments of the process provided herein, the salt rejection-enhancing additive can be a polyhexamethylene biguanide (PHMB) or a PHMB salt, polyhexamethylene guanidine phosphate methylene single salt, p-chlorophenyl biguanide, 4-chlorobenzhydryl biguanide, or a halogenated hexidine selected from among chlorhexidine (1,1'-hexamethylene-bis-5-(4-chlorophenyl biguanide) and salts thereof.

In some embodiments, the polar solution is an aqueous phase containing a polyamine and is coated first on the porous support to form a coated support membrane, followed by applying the organic phase containing the acyl halide solution. The monomers can react when in contact, thereby polymerizing to produce a polymer (e.g., polyamide) discrimination layer at the upper surface of the support membrane. Interfacial polymerization of the polyamine and the polyfunctional acid halide forms a discrimination layer thereby forming a reverse osmosis (RO) membrane, where the RO membrane includes the porous support membrane and the discrimination layer. The salt rejection-enhancing additive can purify the polyfunctional acyl halide in situ. For example, the salt rejection-enhancing additive can sequester, i.e., remove from reaction, hydrolyzed polyfunctional acyl halide, e.g., mono-hydrolyzed or di-hydrolyzed polyfunctional acyl halide, such as mono- or di-hydrolyzed TMC, thereby reducing the concentration of hydrolyzed polyfunctional acyl halide during interfacial polymerization, resulting in increased crosslinking. The thin film composite membrane prepared by the process can be characterized by having a salt rejection that is greater than the salt rejection of a membrane prepared in the absence of the salt rejection-enhancing additive or a salt permeability coefficient (B-value) that is less than the salt permeability coefficient of a membrane prepared in the absence of the additive.

In some embodiments, the polyamine used in the process can be selected from the group consisting of diaminobenzene, triaminobenzene, m-phenylenediamine, p-phenylenediamine, 1,3,5-diaminobenzoic acid, 2,4-diaminotoluene, 2,4-diaminoanisole, xylylenediamine, ethylenediamine, propylenediamine, piperazine, and tris(2-diaminoethyl)amine. In some embodiments, the polyfunctional acid halide used in the process can be selected from the group consisting of trimesoyl chloride, trimellitic acid chloride, isophthaloyl chloride, and terephthaloyl chloride.

The process further can include adding a processing aid selected from among a surfactant, a co-solvent, a drying agent, a catalyst or any combination thereof to the aqueous phase or organic phase or both prior to applying the aqueous phase or organic phase to the porous support membrane.

In some embodiments, the process further includes adding a surfactant to the aqueous phase prior to applying the aqueous phase to the porous support membrane. The surfactant can be selected from among nonionic, cationic, anionic, and zwitterionic surfactants. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyltrimethyl ammonium bromide or chloride, hexadecyltrimethyl ammonium bromide or chloride, and alkyl betaines. Preferred among these are sodium lauryl sulfate (SLS), an alkyl poly(ethylene oxide), e.g., a polyoxyethylene oleyl ether, an octylphenol ethoxylate, and an ethoxylated nonylphenol. For example, in some embodiments, the surfactant is an alkyl poly(ethylene oxide), e.g., a polyoxyethylene oleyl ether, such as polyoxyethylene(20) oleyl ether. When present, the amount of surfactant in the aqueous phase can be from about 0.005 wt % to about 0.5 wt % based on the weight of the aqueous phase.

The co-solvent can be a polar aprotic solvent. Exemplary polar aprotic solvents include dimethylformamide, dimethylacetamide, tetrahydrofuran, dimethyl sulfoxide, 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof.

The processing aid can include a drying agent. A drying agent can be included in order to prevent loss of permeation of the discrimination layer upon drying. Any drying agent that does not interfere with the interfacial polymerization can be used. Exemplary drying agents include a hydrocarbon, an ether, glycerin, citric acid, a glycol, glucose, sucrose, triethylammonium camphorsulfonate, triethylammonium benzenesulfonate, triethylammonium toluenesulfonate, triethylammonium methane sulfonate, ammonium camphor sulfonate, and ammonium benzene sulfonate and any combination thereof. In an exemplary embodiment, the drying aid is triethylammonium camphorsulfonate (TEACSA). When present, a drying agent can be present in the aqueous phase in an amount from about 2 wt % to about 10 wt %, based on the weight of the aqueous phase.

In some embodiments, the process can include an organic phase that includes one or more non-polar liquids. Exemplary non-polar liquids include isoparafinnic solvents, trimethylbenzenes, tetramethylbenzenes, pentamethylbenzene, hexamethylbenzene, diisopropylbenzenes, triisopropylbenzenes, tetraisopropylbenzenes, and combinations thereof.

Provided are processes that further include coating one or both surfaces of the membrane after membrane formation. In some instances, the coating is an aqueous solution of a water-soluble organic polymer. In other instances, the coating is an aqueous solution of sodium citrate. In yet other instances, the coating is one of each of an aqueous solution of a water-soluble organic polymer and an aqueous solution of sodium citrate. For example, provided herein are processes where one surface of the membrane is coated with an aqueous solution of a water-soluble organic polymer that is a polyvinyl alcohol and the other surface is coated with an aqueous solution of sodium citrate.

Also provided herein are processes for preparing a thin film composite membrane, such as a reverse osmosis membrane, that involve preparing an aqueous phase that contains a polyamine, for example, m-phenylene diamine, that is present in an amount of from about 0.1 wt % to 10 wt %, based on the weight of the aqueous phase; preparing an organic phase that contains a polyfunctional acid halide, for example, trimesoyl chloride, that is present in an amount of from about 0.01 wt % to 2 wt %, based on the weight of the organic phase; the aqueous phase or the organic phase or both contain a salt rejection-enhancing additive, for example, polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt, that is present in an amount of from about 0.001 wt % to 1 wt %, based on the weight of the aqueous phase or organic phase; applying the aqueous phase to a surface of a porous support membrane to form a coated support membrane; and applying the organic phase to the coated support membrane to interfacially polymerize the polyamine and the polyfunctional acid halide to form a discrimination layer of a thin film composite membrane that includes the porous support membrane and the discrimination layer, where the thin film composite membrane is characterized by having a salt rejection that is greater than the salt rejection of a membrane prepared in the absence of the salt rejection-enhancing additive and/or a salt permeability coefficient (B-value) that is less than the salt permeability coefficient of a membrane prepared in the absence of the additive. In an exemplary embodiment, the salt rejection-enhancing additive is present in the aqueous phase.

Also provided are thin film composite membranes, such as reverse osmosis membranes, prepared according to the processes provided herein. The reverse osmosis membranes can include a discrimination layer formed on a surface of the support membrane by interfacially polymerizing a polyamine and a polyfunctional acid halide. In some instances, the membrane can exhibit a total dissolved solids (salt) rejection of at least 99.8%, such as between about 99.8% and 99.99%, e.g., 99.8%, 99.81%, 99.82%, 99.83%, 99.84%, 99.85%, 99.86%, 99.87%, 99.88%, 99.89%, 99.9%, 99.91%, 99.92%, 99.93%, 99.94%, 99.95%, 99.96%, 99.97%, 99.98%, or 99.99%, determined by exposing the membrane to deionized water containing 32,000 ppm NaCl at a temperature of 25° C. and a pressure of 800 psi. In some instances, the membrane can exhibit a salt permeability coefficient of about $3\times10^{-8}$ or less, such as about $2.5\times10^{-8}$ or less, or about $2\times10^{-8}$ or less, such as less than about $3\times10^{-8}$, $2.9\times10^{-8}$, $2.8\times10^{-8}$, $2.7\times10^{-8}$, $2.6\times10^{-8}$, $2.5\times10^{-8}$, $2.4\times10^{-8}$, $2.3\times10^{-8}$, $2.2\times10^{-8}$, $2.1\times10^{-8}$, $2\times10^{-8}$, $1.9\times10^{-8}$, $1.8\times10^{-8}$, $1.7\times10^{-8}$, $1.6\times10^{-8}$, $1.5\times10^{-8}$, or less, determined by exposing the membrane to deionized water containing 32,000 ppm NaCl at a temperature of 25° C. and a pressure of 800 psi.

Also provided are methods of purifying seawater or brackish water. The seawater can contain 32,000 ppm or less NaCl. In some instances, the methods include contacting seawater with a thin film composite membrane prepared by the processes described herein. A hydrostatic pressure is applied to the membrane by the water to be purified. In some instances, a hydrostatic pressure of about 800 psi or less is applied to the membrane via the seawater or brackish water.

Also provided are reverse osmosis elements that include a reverse osmosis membrane prepared by any of the methods described herein. In the element, the reverse osmosis membrane can be spirally wound around a central porous permeate collection tube.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings: FIG. 1 is an exemplary embodiment of a spiral-wound module.

DETAILED DESCRIPTION

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "alkyl" refers to a straight, branched, or cyclic chain containing at least one carbon atom and can be saturated or unsaturated. The number of carbon atoms can be specified, for example, 1 to 6 carbon atoms, 2 to 5 carbon atoms, 3 to 4 carbon atoms, 2 to 6 carbon atoms, 3 to 6 carbon atoms, 2 to 4 carbon atoms and 1 to 5 carbon atoms. The number of carbon atoms can be represented, e.g., as $C_1$-$C_6$.

As used herein, $C_1$-$C_x$ includes $C_1$-$C_2$, $C_1$-$C_3$, $C_1$-$C_4$, $C_1$-$C_5$, ... $C_1$-$C_x$.

As used herein, "flux" refers to the amount of material that flows through a unit area per unit time, such as the amount of liquid flowing through a given membrane area during a given time. Generally, flux depends on the thickness of the membrane, the feed composition, the temperature of the feed, the downstream vacuum, and the feed-side pressure.

As used herein, a "combination" refers to any association between two items or among more than two items. The association can be spatial or refer to the use of the two or more items for a common purpose.

As used herein, a "rejection-enhancing additive" refers to at least one component that improves the rejection characteristics of a membrane. For example, a "salt rejection-enhancing additive" can increase the salt rejection characteristics of a membrane.

As used herein, "salt rejection" refers to the measure of the combined content of all inorganic and organic substances in the water.

As used herein, "non-hydrolyzed" with respect to a polyfunctional acyl halide refers to an acyl halide where none of the halide groups have been hydrolyzed from halide to hydroxyl.

As used herein, "partially hydrolyzed" with respect to a polyfunctional acyl halide refers to an acyl halide with more than one halide group where at least one, but not all, of the halide groups have been hydrolyzed from halide to hydroxyl. In some embodiments, a partially hydrolyzed acyl halide can include mono-hydrolyzed and di-hydrolyzed acyl halides, where one or two halide group(s) of a polyfunctional acyl halide having three or more halide groups has been hydrolyzed to one or two hydroxyl group(s), respectively. In exemplary embodiments, "partially hydrolyzed" acyl halide refers to mono-hydrolyzed trimesoyl chloride and/or di-hydrolyzed trimesoyl chloride.

As used herein, "completely hydrolyzed" with respect to a polyfunctional acyl halide refers to an acyl halide with more than one halide group where all of the halide groups have been hydrolyzed from halide to hydroxyl. For example, trimesoyl chloride is a polyfunctional acyl halide having three halide groups (—Cl), and a "completely hydrolyzed" trimesoyl chloride means that all three halide groups have been hydrolyzed to hydroxyl (—OH) groups.

As used herein, "hydrolyzed" with respect to a polyfunctional acyl halide refers to an acyl halide that is either partially hydrolyzed or completely hydrolyzed, but does not include non-hydrolyzed polyfunctional acyl halides.

As used herein, the term "surfactant" refers to molecules that absorb at the air/water, air/oil and/or oil/water interfaces, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, "halogenated" refers to the presence of one or more halogen substituents, such as fluorine, chlorine, bromine, or iodine or any combination thereof. For example, a halogenated $C_1$ alkyl can be any of $CH_2Cl$, $CHCl_2$, $CCl_3$, $CH_2F$, $CHF_2$, $CF_3$, $CH_2Br$, $CHBr_2$, $CBr_3$, $CH_2I$, $CHI_2$, or $CI_3$.

As used herein, the term "contacting" refers to bringing two or more materials into close enough proximity whereby they can interact.

B. Thin Film Composite Membranes

It is shown herein that the TFC membranes described herein that can be prepared by purifying the polyfunctional acyl halide in situ during formation of the membrane by removal of hydrolyzed polyfunctional acyl halide through the addition of a salt rejection-enhancing additive in the aqueous phase or organic phase or both of the interfacial polymerization reaction have advantageous properties compared to TFC membranes that are prepared in the absence of the salt rejection-enhancing additive. During the interfacial polymerization reaction to form the membrane, the monomer in the organic phase, for example, the polyfunctional acyl halide, e.g., trimesoyl chloride, can readily hydrolyze. Hydrolysis can occur, for example, when the acyl halide is exposed to air and/or water. The hydrolysis product, a partially hydrolyzed acyl halide, e.g., mono-hydrolyzed or di-hydrolyzed, when incorporated into a thin film composite membrane, can yield a membrane with decreased rejection, for example, decreased salt rejection, as compared to a membrane prepared with purified polyfunctional acyl halide, such as a polyfunctional acyl halide purified prior to use. It has been discovered, however, that the salt rejection-enhancing additives described herein can allow for the in situ purification of the polyfunctional acyl halide, e.g., trimesoyl chloride, by forming a complex with the hydrolysis products, thus sequestering, i.e., removing, the hydrolyzed acyl halide from reaction and reducing the concentration of hydrolyzed acyl halide available during the interfacial polymerization reaction, resulting in an increased amount of crosslinking between the non-hydrolyzed acyl halide and the monomer in the aqueous phase. Though the membranes can exhibit a decrease in flux values, the provided TFC membranes can exhibit increased crosslinking, resulting in higher salt rejection as compared to TFC membranes prepared in the absence of the additive.

Thin film composite (TFC) membranes are typically produced by interfacial polymerization of monomers in two immiscible phases, e.g., a monomer in a non-polar (i.e., organic) phase with a monomer in a polar (i.e., aqueous) phase, on a porous support membrane, and methods of preparing the TFC membranes. The provided TFC membranes can contain one or more additives in the aqueous phase or organic phase or both of the interfacial polymerization reaction. By virtue of the presence of the additives in the aqueous phase or organic phase or both, the monomer in the non-polar (i.e., organic) phase, e.g., polyfunctional acyl halide, can be purified in situ, for example, by forming a complex between the salt rejection-enhancing additive and hydrolyzed polyfunctional acyl halide, resulting in a higher crosslinking of the polymer forming the TFC membrane and thus resulting in advantageous properties, such as, for example, enhanced salt rejection. The TFC membranes provided herein that can be prepared by purifying the monomer in the organic phase in situ by incorporating one or more salt rejection-enhancing additives in the aqueous phase or organic phase or both of the interfacial polymerization reaction exhibit greater salt rejection values than the same membranes prepared in the absence of the additive.

In particular, the polyfunctional acyl halide used in the interfacial polymerization reaction to prepare the TFC membranes provided herein can be purified in situ by sequestering or removing hydrolyzed polyfunctional acyl halide from the interfacial polymerization reaction through addition of one or more salt rejection-enhancing additives in the aqueous phase or organic phase or both of the interfacial polymerization reaction that produces the TFC membranes that can form a complex with hydrolyzed polyfunctional acyl halide. For example, the salt rejection-enhancing additive can be a biguanide compound, dicarbonate compound, pentathiodicarbonate compound, or salts thereof, for example, a polyalkylene biguanide, polyalkylene dicarbonate, or polyalkylene pentathiodicarbonate compound or salt thereof, e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt. In some embodiments, the additive can be added to the aqueous phase. In some embodiments, the additive can be added to the organic phase. In some embodiments, the additive can be added to the aqueous phase and the organic phase.

The TFC membranes can be produced by interfacial polymerization of a polyamine monomer in the aqueous phase with a polyfunctional acyl halide monomer in the organic phase on a porous support membrane to form a thin selective layer on top of the substrate. The aqueous phase or organic phase or both can contain between 0.01 wt % and 5.0 wt % of a salt rejection-enhancing additive, such as a biguanide compound, dicarbonate compound, pentathiodicarbonate compound, or salt thereof. The use of the additive in the aqueous phase or organic phase or both of the interfacial polymerization reaction to purify the polyfunctional acyl halide in situ results in a TFC membrane that exhibits enhanced salt rejection as compared to the same TFC membrane that does not contain the additive in the aqueous phase or organic phase of the interfacial polymerization reaction. Further description and examples of the TFC membranes and methods of producing the membranes are provided below.

In addition, provided herein are methods of producing thin film composite membranes, such as via interfacial polymerization, where the polyfunctional acyl halide is purified in situ by removal of hydrolyzed polyfunctional acyl halide through the addition of a salt rejection-enhancing additive, for example, a biguanide compound, dicarbonate compound, pentathiodicarbonate compound, or salts thereof, in the aqueous and/or organic phase of the interfacial polymerization reaction, that produce membranes that exhibit high salt rejection. Thus, provided herein are methods of producing such TFC membranes, such as methods that can include addition of a salt rejection-enhancing additive, such as a biguanide compound, dicarbonate compound, pentathiodicarbonate compound, or salts thereof, in the aqueous and/or organic phase of an interfacial polymerization reaction on a porous support membrane, to remove hydrolyzed the monomer in the non-polar phase, such as for example TMC, and thus produce TFC membranes with a higher degree of crosslinking polymerization that ultimately can lead to enhanced salt rejection characteristics when used in the purification of water, such as brackish water or seawater, as compared to TFC membranes that do not contain the additive.

The TFC membranes provided herein, for example, reverse osmosis membranes, are prepared by adding one or more salt rejection-enhancing additives to the aqueous phase or organic phase or both of the interfacial polymerization reaction to remove the hydrolyzed polyfunctional acyl halide in the organic phase during the interfacial polymerization step. Salt rejection-enhancing additives include additives that are able to react with the hydrolyzed polyfunctional acyl halide in the organic phase, e.g., TMC, to allow polymerization with the non-hydrolyzed polyfunctional acyl halide. Exemplary embodiments of such salt rejection-enhancing additives include biguanide compounds, dicarbonate compounds, pentathiodicarbonate compounds, and salts thereof. Suitable compounds for use in the membranes and methods provided herein can include any compound that, when complexed with a partially hydrolyzed polyfunctional acyl halide, for example, a mono-hydrolyzed or di-hydrolyzed polyfunctional acyl halide, e.g., mono-hydrolyzed or di-hydrolyzed trimesoyl chloride, improves the salt rejection performance of the membrane as compared to the same TFC membrane prepared in the absence of the compound. Exemplary salt rejection-enhancing additives include biguanide compounds, dicarbonate compounds, pentathiodicarbonate compounds, and salts thereof, e.g., polyalkylene biguanide, polyalkylene dicarbonate, or polyalkylene pentathiodicarbonate compounds and salts thereof.

The salt rejection-enhancing compounds suitable for use in the manufacturing process of the TFC membranes provided herein include compounds having the following general formula I:

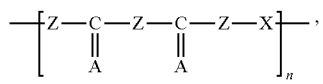

and salts thereof, where formula I represents a recurring polymer unit where n is a number equal to or greater than 1, generally between about 1 and 60, and typically between about 1 and 30, for example, n typically has an average value such that the molecular weight of the compound corresponds to where n is between about 10 and 15, such as between about 10 and 13, for example, the molecular weight is between about 200 and 8,000, but can be higher or lower; Z is a heteroatom, for example, Z can be S, O, or N (in the form of the NH group); A is a heteroatom capable of forming a double bond with carbon, for example, A can be O, S, or N (in the form of the NH group); and, optionally, X, that when present is an alkyl chain having 1-30 carbon atoms, such as between 1 and 15 carbon atoms, and typically between 4 and 8 atoms, such as 1, 2, 3, 4, 5, 6, 7, 8, 9, or 10 carbon atoms, where X can be a saturated alkyl (i.e., —CH$_2$—) or X can be a halogenated alkyl. In an exemplary embodiment, X is an alkyl chain with 6 carbons and represents —(CH$_2$)$_6$—.

The salt rejection-enhancing compound can be modified or derivatized with other functional groups, such as hydroxy, amine, halogen, epoxy, alkyl or alkoxy silyl functionalities to enable direct immobilization to a surface. The salt rejection-enhancing compound can be the free base or can be the salt, including salts with an inorganic acid, such as hydrochloride, hydrofluoride, nitrate, sulfate and/or phosphate, and/or salts with an organic acid, such as carboxylic acid (carbonate), acetate, benzoate, tartrate, adipate, lactate, formate, maleate, glutamate, ascorbate, citrate, gluconate, oxalate, succinate, pamoate, salicylate, isethionate, succinimate, mono-diglycolate, dimethanesulfonate, di-isobutyrate, and/or glucoheptonate, or can be in an aqueous solution.

In some embodiments, the salt rejection-enhancing compound can be a biguanide compound or salt thereof. For example, the salt rejection-enhancing compound can have the following formula II:

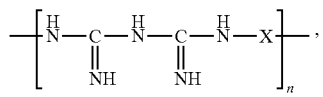

where X is optional, and, when present, is an alkyl chain having between 1 and 30 carbons. In some embodiments the biguanide compounds for use in the membranes and methods provided herein are polyalkylene biguanides and salts thereof, represented by formula I above, where Z is a heteroatom represented by N (in the form of the NH group), A is a heteroatom represented by N (in the form of the NH group), and X is an alkyl chain with between 1 and 10 carbons, typically between 2 and 10, such as between 2 and 8 or 4 and 7, for example, 1, 2, 3, 4, 5, 6, 7, 8, 9, or 10 carbons. An exemplary polyalkylene biguanide is polyhexamethylene biguanide (PHMB), and salts thereof, such as PHMB hydrochloride. Polyhexamethylene biguanides, also known as polyhexanide and polyaminopropyl biguanide, are compounds represented by formula I above in which Z is a heteroatom represented by N (in the form of the NH group), A is a heteroatom represented by N (in the form of the NH group), and X is a polyalkylene chain represented by the —(CH$_2$)$_6$— group. An exemplary PHMB includes the PHMB sold as a 20 wt % aqueous solution, such as the PHMB sold by Arch Chemical, Norwalk, Conn.

PHMB is an antimicrobial compound with fast-acting properties that is applied in a variety of applications that include eye and skin treatment compositions (U.S. Pat. Nos. 7,569,212; 7,560,421); antimicrobial hand washes; cleaning compositions (U.S. Pat. Nos. 7,511,006; 7,501,027; 7,494,963); preservatives, such as in cosmetics, personal care products, fabric softeners, contact lens solutions, and hand washes (U.S. Pat. No. 7,537,776); air filter treatments as an alternative to ozone; and as a treatment (sanitizer) for water systems, such as in pools and spas (U.S. Pat. No. 6,710,017). PHMB can be used as a sanitizer or preservative to kill viruses and bacteria (including methicillin-resistant *Staphylococcus aureus* (MRSA), *Salmonella, Campylobacter*, and *E. coli*) and to control algae in a wide range of applications, including controlling odor in textiles; preventing microbial contamination in wound irrigation and sterile dressings; disinfecting medical and dental utensils and trays, farm equipment, animal drinking water, and hard surfaces for food handling institutions and hospitals; and to deodorize vacuums and toilets.

Other suitable biguanide compounds include, but are not limited to, polyhexamethylene guanidine phosphate methylene single salt, p-chlorophenyl biguanide, 4-chlorobenzhydryl biguanide, halogenated hexidines such as, but not limited to, chlorhexidine (1,1'-hexamethylene-bis-5-(4-chlorophenyl biguanide)) and salts thereof.

In some embodiments, the salt rejection-enhancing compound can be a dicarbonate compound or salt thereof. For example, the salt rejection-enhancing compound can have the following formula III:

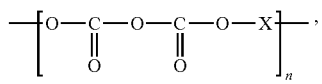

where X is optional, and, when present, is an alkyl chain having between 1 and 30 carbons. In some embodiments the dicarbonate compounds for use in the membranes and methods provided herein are polyalkylene dicarbonates and salts thereof, represented by formula I above, where Z is a heteroatom represented by O, A is a heteroatom represented by O, and X is an alkyl chain with between 1 and 10 carbons, typically between 2 and 10, such as between 2 and 8 or 4 and 7, for example, 1, 2, 3, 4, 5, 6, 7, 8, 9, or 10 carbons. An exemplary polyalkylene dicarbonate is polyhexamethylene dicarbonate, and salts thereof, such as polyhexamethylene dicarbonate hydrochloride. Polyhexamethylene dicarbonates are compounds represented by the formula I above in which Z is a heteroatom represented by O, A is a heteroatom represented by 0, and X is a polyalkylene chain represented by the —(CH$_2$)$_6$— group.

In some embodiments, the salt rejection-enhancing compound can be a pentathiodicarbonate compound or salt thereof. For example, the salt rejection-enhancing compound can have the following formula IV:

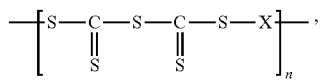

where X is optional, and, when present, is an alkyl chain having between 1 and 30 carbons. In some embodiments the pentathiodicarbonate compounds for use in the membranes and methods provided herein are polyalkylene pentathiodicarbonates and salts thereof, represented by formula I above, where Z is a heteroatom represented by S, A is a heteroatom represented by S, and X is an alkyl chain with between 1 and 10 carbons, typically between 2 and 10, such as between 2 and 8 or 4 and 7, for example, 1, 2, 3, 4, 5, 6, 7, 8, 9, or 10 carbons. An exemplary polyalkylene pentathiodicarbonate is polyhexamethylene pentathiodicarbonate, and salts thereof, such as polyhexamethylene pentathiodicarbonate hydrochloride. Polyhexamethylene pentathiodicarbonates are compounds represented by the formula I above in which Z is a heteroatom represented by S, A is a heteroatom represented by S, and X is a polyalkylene chain represented by the —$(CH_2)_6$— group.

The salt rejection-enhancing compound, for example, the polyalkylene biguanide, polyalkylene dicarbonate, or polyalkylene pentathiodicarbonate compounds or salts thereof, can be employed as a water-soluble salt. Such cationic salts can include water-soluble salts of common inorganic and organic acids such as chlorides, bromides, nitrates, sulfates, bisulfates, acetates, and gluconates. In one example, the salt rejection-enhancing compound is polyhexamethylene biguanide hydrochloride. Exemplary of a water-soluble salt of a biguanide compound includes polyhexamethylene biguanides sold as 20% aqueous solutions of PHMB (hydrochloride salt) under the trade names Cosmocil™ CQ and Vantocil™ IB (Arch Chemical; Norwalk, Conn.). In another example, the salt rejection-enhancing compound is a dicarbonate compound that is polyhexamethylene dicarbonate hydrochloride. In yet another example, the salt rejection-enhancing compound is a pentathiodicarbonate compound that is polyhexamethylene pentathiodicarbonate hydrochloride.

The amount of salt rejection-enhancing compound, such as a biguanide compound, dicarbonate compound, pentathiodicarbonate compound, or salts thereof, for example, a polyalkylene biguanide, polyalkylene dicarbonate, or polyalkylene pentathiodicarbonate compound or salts thereof, e.g., polyhexamethylene biguanide, polyhexamethylene dicarbonate, or polyhexamethylene pentathiodicarbonate and salts thereof, included in the aqueous and/or organic phase of the interfacial polymerization reaction is between about 0.001 wt % and 1 wt %, inclusive, such as between about 0.001% and 0.005%, 0.001% and 0.01%, 0.001% and 0.025%, 0.001% and 0.05%, 0.001% and 0.1%, 0.001% and 0.25%, 0.001% and 0.5%, 0.001% and 0.75%, 0.001% and 1%, 0.005% and 0.01%, 0.005% and 0.025%, 0.005% and 0.05%, 0.005% and 0.1%, 0.005% and 0.25%, 0.005% and 0.5%, 0.005% and 0.75%, 0.005% and 1%, 0.01% and 0.025%, 0.01% and 0.05%, 0.01% and 0.1%, 0.01% and 0.25%, 0.01% and 0.5%, 0.01% and 0.75%, 0.01% and 1%, 0.025% and 0.05%, 0.025% and 0.1%, 0.025% and 0.25%, 0.025% and 0.5%, 0.025% and 0.75%, 0.025% and 1%, 0.05% and 0.1%, 0.05% and 0.25%, 0.05% and 0.5%, 0.05% and 0.75%, 0.05% and 1%, 0.1% and 0.25%, 0.1% and 0.5%, 0.1% and 0.75%, 0.1% and 1%, 0.25% and 0.5%, 0.25% and 0.75%, 0.25% and 1%, 0.5% and 0.75%, 0.5% and 1%, and 0.75% and 1%, salt rejection-enhancing compound or salt thereof, by weight of the aqueous and/or organic phase. The aqueous and/or organic phase can contain less than 1 wt % biguanide compound, dicarbonate compound, pentathiodicarbonate compound, or salt thereof, such as less than 0.5 wt %, typically less than 0.25 wt %. For example, the aqueous and/or organic phase of the interfacial polymerization reactions described herein can contain at least about 0.001%, 0.0025%, 0.005%, 0.0075%, 0.01%, 0.025%, 0.05%, 0.075%, 0.1%, 0.25%, 0.5%, 0.75%, but less than about 1 wt % salt rejection-enhancing compound or salt thereof.

C. Other Additives

In the processes provided herein, the aqueous phase or organic phase or both of the interfacial polymerization reaction can include other additives in addition to the salt rejection-enhancing additives (e.g., a biguanide compound, dicarbonate compound, pentathiodicarbonate compound, or salts thereof) described herein. For example, the aqueous phase or organic phase or both can include processing aids, such as surfactants, drying agents, catalysts, co-solvents, such as polar aprotic solvents, or any combination thereof.

Any additive can be included in the processes provided herein, with the exception of any additive(s) that would hinder polymerization of non-hydrolyzed polyfunctional acyl halide during the interfacial polymerization reaction and/or hinder in situ purification of the polyfunctional acyl halide. For example, additives that can hinder the formation of the complex between the salt-rejection enhancing additive and the hydrolyzed polyfunctional acyl halide typically are not included. Additives such as flux-enhancing additives, for example, nanoparticles, metal chelate additives, or any other flux-enhancing additives which can increase the flux of a TFC membrane by increasing the permeability of the membrane, typically are not included. Exemplary additives include phosphoramides, dialkyl sulfoxides, metal chelate additives containing a bidentate ligand and a metal atom or metal ion, e.g., acetylacetonate (acac) or fluorinated acetylacetonate, beta-diketonates or fluorinated beta-diketonates, zeolites, fullerenes, carbon nanotubes, and inorganic mineral compounds.

1. Surfactants

In some embodiments, the aqueous phase of the interfacial polymerization reaction can include a surfactant or a combination of surfactants. The surfactants can, for example, help the aqueous phase wet the support layer or can help in the dispersion of materials in the aqueous phase. The surfactant(s) can be selected from among nonionic, cationic, anionic, and zwitterionic surfactants depending on the chemistry of the other additives. For example, a cationic surfactant would not be selected when anionic additives are being used. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), such as polyoxyethylene oleyl ethers, e.g., polyoxyethylene(20) oleyl ether (Brij® 98), copolymers of poly(ethylene oxide) and poly (propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyl-trimethyl ammonium bromide or chloride, hexadecyl-trimethyl ammonium bromide or chloride, and alkyl betaines. Preferred among these are alkyl poly(ethylene oxides), SLS, octylphenol ethoxylates, and ethoxylated nonylphenols.

When present, the amount of surfactant in the aqueous phase is from about 0.005 wt % to about 0.5 wt % based on the weight of the aqueous phase. In some embodiments, the aqueous phase contains no surfactant. In some embodiments, the aqueous phase contains an amount of surfactant from about 0.01 wt % to about 0.25 wt % based on the weight of the aqueous phase. In an exemplary embodiment, the surfactant is an alkyl poly(ethylene oxide), such as a polyoxyethylene oleyl ether, for example, a polyoxyethylene (20) oleyl ether, and is present in the aqueous phase in an amount of between about 0.05% and 0.25%, such as about 0.1%, based on the weight of the aqueous phase.

2. Drying Agents

In some embodiments, one or more drying agents can be included in the aqueous phase of the interfacial polymerization reaction mixture to form the TFC membrane. Drying agents can include, for example, hydrophobic organic compounds, such as a hydrocarbon or an ether, glycerin, citric acid, glycols, glucose, sucrose, triethylammonium camphorsulfonate, triethylammonium benzenesulfonate, triethylammonium toluenesulfonate, triethylammonium methane sulfonate, ammonium camphor sulfonate, and ammonium benzene sulfonate, and those described in U.S. Pat. Nos. 4,855,048; 4,948,507; 4,983,291; and 5,658,460.

When present, the amount of drying agent in the aqueous phase is from about 2 wt % to about 10 wt % based on the weight of the aqueous phase. In some embodiments, the aqueous phase contains an amount of drying agent from about 3 wt % to about 5 wt % based on the weight of the aqueous phase.

In some embodiments, the aqueous phase of the interfacial polymerization reaction can include triethylammonium camphorsulfonate (TEACSA) as the drying agent. When present, the TEACSA is present in an amount from about 2 wt % to about 10 wt % based on the weight of the aqueous phase. In some embodiments, the TEACSA is present in the aqueous phase in an amount from about 3 wt % to about 5 wt %. In some embodiments, the amount of TEACSA in the aqueous phase is about 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt % based on the weight of the aqueous phase, or an amount in a range of at or about a to at or about b, where a is any one of the preceding wt % values of TEACSA, and b is any one of the preceding wt % values of TEACSA that is >a, such as from about 2 wt % to about 10 wt %, or from about 3 wt % to about 7.75 wt %, or from about 4 wt % to about 6 wt %, etc. In some embodiments, the TEACSA is present in the aqueous phase in an amount of about 4.5 wt %, based on the weight of the aqueous phase.

3. Catalysts

Catalysts can be included in the aqueous phase. In some embodiments, a catalyst can include diethylamine, triethylamine, ethylene diamine, triethanolamine, diethanolamine, ethanolamine, dimethylaminopyridine, or combinations thereof. In some embodiments, the catalyst can be an acid catalyst or a base catalyst. An acid catalyst can be an inorganic acid, an organic acid, a Lewis acid, or a quaternary ammonium salt or an acid salt of ammonia or a primary, secondary or tertiary amine. Exemplary acid catalysts include hydrochloric acid, nitric acid, sulfuric acid, an aliphatic sulfonic acid, an aromatic sulfonic acid, a carboxylic acid, a fluorinated carboxylic acid, such as trifluoroacetic acid, a cycloaliphatic sulfonic acid, boric acid, tetrafluoroboric acid, aluminum trihalide, an aluminum trialkoxide, a boron trihalide, such as a boron trifluoride, a tin tetrahalide, such as tin tetrachloride and zinc tetrafluoroborate.

Exemplary base catalysts include alkoxide salts, such as sodium ethoxide; hydroxide salts, such as sodium hydroxide and potassium hydroxide; carbonate salts, such as potassium carbonate; phosphate salts, such as trisodium phosphate; phenoxide salts, such as sodium phenoxide; borate salts, such as sodium borate; carboxylate salts, such as potassium acetate; ammonia; and primary, secondary and tertiary amines.

When present, the amount of catalyst in the aqueous phase is from about 0.001 wt % to about 0.5 wt % based on the weight of the aqueous phase. In some embodiments, the aqueous phase contains an amount of catalyst from about 0.005 wt % to about 0.25 wt % based on the weight of the aqueous phase.

D. Preparation of TFC Membranes

Thin film composite membranes can be used in reverse osmosis (RO) and forward osmosis (FO) applications. For RO applications, the membranes include a support layer, which is preferably porous. The support layer can be hydrophilic or hydrophobic. In some applications, the support layer is hydrophilic. The TFC membrane also includes at least one discrimination layer on a surface of the support layer. The TFC membrane can include an anti-fouling layer deposited on either or both surfaces of the TFC membrane. The TFC membrane also can include a protective layer deposited on either or both surfaces of the TFC membrane or on an anti-fouling layer. For example, a solution of a hydrophilic polymer, such as polyvinyl alcohol in water, or a solution of sodium citrate in water, or both, can be applied to the surface of the discrimination layer followed by application of heat to provide a heat cure of the hydrophilic polymer layer.

1. Support Layer

The support layer typically includes a polymeric microporous support membrane, which in turn is often supported by a non-woven or woven mesh fabric to improve handling properties of the membranes or for mechanical strength or both. The support layer can include a polysulfone or other suitably porous membrane, such as a membrane containing polyethersulfone, poly(ether sulfone ketone), poly(ether ethyl ketone), poly(phthalazinone ether sulfone ketone), polyacrylonitrile, polyvinyl chloride, polyester, polystyrene, polysulfone, polypropylene, cellulose nitrate, cellulose acetate, cellulose diacetate, or cellulose triacetate. The support layer typically is about 25 to 250 microns in thickness. The support layer is porous, and often the smallest pores of the support layer are located very near the upper surface. Porosity at the surface can be low, for instance from 5-15%, of the total surface area.

The preparation of the support layer can include spraying or casting a polymer solution onto a woven or non-woven fabric layer. Exemplary processes known in the art to form the support layer are disclosed, e.g., in U.S. Pat. Nos. 3,926,798; 4,039,440; 4,337,154; and 8,177,978; and in U.S. Patent Publication Nos. 2011/0174728 and 2014/0014575, the disclosure of each of which is incorporated herein by reference. One or more than one reinforcing fabric layers of a woven or nonwoven material or a combination thereof, made up of polymeric fibers, can be included in the TFC membrane. When present, the fabric layer preferably is permeable to water, is flat, and is without stray fibers that could penetrate the support layer or the discrimination layer. The fabric layer generally is thin to decrease cost and to maximize membrane area, is resistant to extensional forces, and is mechanically resistant to deformation at high pressures.

The preparation of the support layer can include the addition of a solvent, such as N-methylpyrrolidone (NMP) solvent (Acros Organics, Waltham, Mass.), to a polysulfone polymer ($M_n$-26,000 ($M_n$ being the number average molecular weight) from Aldrich, St. Louis, Mo.) in transparent bead form in airtight glass bottles. Alternatively, dimethylformamide (DMF) can be used as the solvent. The mixture then is agitated for several hours until complete dissolution of the polysulfone polymer is achieved, forming a dope or casting solution. The casting solution can be cast or spread over a woven or non-woven mesh fabric layer, which optionally can be attached to glass plate via a knife-edge. In some embodiments, the glass plate with the mesh fabric layer and casting solution can be immediately immersed into demineralized water, which has been maintained at the desired temperature, such as from about 15° C. to about 30° C. Immediately, phase inversion begins and after several minutes, the woven or non-woven fabric layer supporting the polysulfone membrane can be separated from the glass plate to form the support layer. The support layer then can be washed thoroughly with deionized water and stored in cold conditions until used. In a continuous coating process for production of a support layer (e.g., using equipment and/or a process similar to those described in U.S. Pat. Nos. 4,214,994; 4,277,344; 6,153,133; 7,490,725; and 8,580,341; U.S. Pat. App. Pub. Nos. 2009/0050558A1 and 2012/0292249A1; and International Pat. App. Pub. No. WO 2014/080426 A1, which describe coating processes for continuous preparation of reverse osmosis membranes), a glass plate would not be required. The porous support layer typically is kept wet until use.

The casting solution of the support layer can include additives. For example, the casting solution can include an alkylene glycol, a polyalkylene glycol, N-methyl-2-pyrrolidinone, dimethylacetamide, or any combination of these additives. Exemplary alkylene glycols include ethylene glycol, diethylene glycol, triethylene glycol, propylene glycol, dipropylene glycol, and tripropylene glycol and combinations thereof. Exemplary polyalkylene glycols include a polyethylene glycol (PEG) and a polypropylene glycol. Polyethylene glycols (PEGs) having molecular weights of 400 to 20,000, preferably 600 to 2,000, can be included in the casting solution.

2. Discrimination Layer

At least one discrimination layer that contains a polyamide is formed on a surface of the support layer, thereby forming a thin film composite membrane. The discrimination layer is synthesized using an interfacial polymerization process on the porous support membrane. In the synthesis of the discrimination layer, two immiscible solvents are used, for example, an aqueous phase solution and an organic phase solution, so that a monomer in one solvent reacts with a monomer in the other solvent to polymerize and form the discrimination layer. The polymerization reactions are very fast and relatively high molecular weight polymers are obtained.

The discrimination layer is a permeable membrane that generally can contain any material as long as the discrimination layer allows filtration of a fluid for which filtration is desired, with the exception of any additive or material that would hinder polymerization of non-hydrolyzed polyfunctional acyl halide during interfacial polymerization and/or hinder in situ purification of the polyfunctional acyl halide, as discussed above, in which the salt rejection-enhancing additive interacts and forms a complex with hydrolyzed polyfunctional acyl halide in the organic phase to prevent polymerization between the monomer in the aqueous phase and hydrolyzed polyfunctional acyl halide. In an exemplary embodiment, the discrimination layer can be a polyamide layer. Although the chemistry of the discrimination layer is not to be viewed as limited, in an exemplary embodiment the polyamide layer can be formed by interfacial polymerization of monomers in a polar solution and a non-polar solution. An exemplary polar solution can be an aqueous phase containing a polyamine such as m-phenylenediamine (MPD). An exemplary non-polar solution can be an organic phase containing a polyfunctional acid (acyl) halide such as trimesoyl chloride (TMC). The salt rejection-enhancing additives described herein can be added to either the polar or non-polar solution or to both solutions to form a discrimination layer as described herein. In the exemplary embodiment, the salt rejection-enhancing additive reacts with the hydrolyzed TMC so as to promote polymerization only between MPD and non-hydrolyzed TMC.

Discrimination layers prepared by methods and chemistries known in the art, for example, the chemistry and methods of manufacturing discrimination layers that are disclosed in any of U.S. Pat. Nos. 4,277,344; 4,902,424; 5,108,607; 5,543,046; 6,337,018; and 7,109,140, all of which are herein incorporated by reference, such as membranes prepared in the presence of partially or completely hydrolyzed acyl halide, often exhibit lower salt rejection after formation on a surface of a support layer as compared to membranes prepared without prior purification of the reactants, such as the monomers, e.g., the polyfunctional acyl halide. During the interfacial polymerization reaction to form the membrane, the polyfunctional acyl halide, e.g., trimesoyl chloride, readily hydrolyzes in air. The hydrolysis products, e.g., mono-, di-, or tri-hydrolyzed acyl halides, when incorporated into a thin film composite membrane, can yield a membrane with decreased rejection, for example, decreased salt rejection, as compared to a membrane prepared with purified polyfunctional acyl halide. Without wishing to be bound by any one theory, it is believed that the salt rejection-enhancing additives described herein allow for the in situ purification of the polyfunctional acyl halide, e.g., trimesoyl chloride, by forming a complex with the hydrolysis products, e.g., mono-, di-, or tri-hydrolyzed acyl halide, thus sequestering, i.e., removing, the hydrolyzed acyl halide from reaction and reducing the concentration of hydrolyzed acyl chloride available during the interfacial polymerization reaction. Though the membranes can exhibit a decrease in flux values, the provided TFC membranes can exhibit increased crosslinking, resulting in higher salt rejection as compared to TFC membranes prepared in the absence of the additive. As shown herein, the methods and chemistries known in the art can be modified to include the salt rejection-enhancing additives described herein during formation of the discrimination layer, such as by adding the additives to either the polar or non-polar solution or both solutions, thereby allowing for in situ purification of the acyl chloride, and producing thin film composite membranes that exhibit high salt rejection without suffering a significant loss in flux, thereby overcoming the deficiencies of known membranes.

In some embodiments, the discrimination layer can contain a polyamide formed by the interfacial polymerization between one or more di- or polyfunctional amines and one or more di- or polyfunctional acyl chlorides. The di- or polyfunctional amines can be aromatic and/or aliphatic. The di- or polyfunctional acyl chlorides can be aromatic and/or aliphatic.

The polymer matrix that forms the discrimination layer can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers can also be chosen so as to be capable of undergoing an interfacial polymerization reaction to form a polymer matrix (i.e., a three-dimensional polymer network) when brought into contact. The first and second monomers also can be selected so as to be capable of undergoing a polymerization reaction when brought into contact to form a polymer product that is capable of subsequent crosslinking by, e.g., exposure to heat, light radiation, or a chemical crosslinking agent.

The first monomer can be selected so as to be soluble in a polar liquid, preferably water, to form a polar mixture. The difunctional or polyfunctional nucleophilic monomer can have primary or secondary amino groups and can be aromatic (e.g., a diaminobenzene, a triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, piperazine, and tris(2-diamino-ethyl)amine). In a further example, the polar liquid and the first monomer can be the same compound; that is, the first monomer can be provided and not dissolved in a separate polar liquid.

Examples of suitable amine species include primary aromatic amines having two or three amino groups, e.g., m-phenylenediamine, and secondary aliphatic amines having two amino groups, for example piperazine. The amine typically can be applied to the microporous support as a solution in a polar liquid, e.g., water. The resulting polar mixture typically includes from about 0.1 wt % to about 10 wt %, preferably from about 0.5 wt % to about 6 wt %, amine, such as 0.5 wt %, 1 wt %, 2 wt %, 3 wt %, 4 wt %, 5 wt %, or 6 wt % amine, based on the weight of the polar mixture. Once coated on a porous support layer, excess polar mixture optionally can be removed. The polar mixture need not be aqueous, but the polar liquid should be immiscible with the apolar liquid. Although water is a preferred solvent, non-aqueous polar solvents can be used, such as acetonitrile and dimethylformamide (DMF).

The polar mixture can be applied to the porous support layer by dipping, immersing, coating, spraying or any other application techniques. Once coated on the porous support layer, excess polar mixture optionally can be removed by evaporation, drainage, air knife, rubber wiper blade, nip roller, sponge, or other devices or processes.

In some embodiments of the processes provided herein, an aqueous phase containing the salt rejection-enhancing additives described herein is applied on a surface of a support layer, and an organic phase layer then is applied, the components of which interact with components of the aqueous phase, and at the interface between these layers polymerization occurs, resulting in formation of a discrimination layer.

The method of forming the discrimination layer on a surface of the porous support layer can include floating the porous support layer on the surface of the aqueous phase, or casting the aqueous phase on a surface of the porous support layer; or spraying the aqueous phase onto a surface of the porous support layer; or immersing the porous support layer in the aqueous phase. In methods that include floating or immersing the porous support in the aqueous phase, the treating time can be varied widely in a range of from about 1 second to about 24 hours or longer, but such treating time is not critical. The treatment effected once is usually sufficient, but the treatment can be performed twice or more.

Representative conditions for reaction of an amine (e.g., MPD) with an electrophile (e.g., TMC) to form a polyamide thin film composite membrane include use of a ratio of concentration of MPD to concentration of TMC in the range of from about 15:1 to about 30:1, with the MPD concentration being from about 2 wt % to about 8 wt % of the polar phase (aqueous phase). In some embodiments, the ratio of concentration of MPD to concentration of TMC is about 15:1, or about 16:1, or about 17:1, or about 18:1, or about 19:1, or about 20:1, or about 21:1, or about 22:1, or about 23:1, or about 24:1, or about 25:1, or about 26:1, or about 27:1, or about 28:1, or about 29:1, or about 30:1. The polymerization reaction can be carried out at room temperature in an open environment, or the temperature of either the polar or non-polar liquid, or both, can be modulated or controlled, e.g., at a temperature above room temperature (20° C. to 25° C.) or a temperature below room temperature. Once formed, the discrimination layer can act as a barrier to inhibit contact between the reactants and to slow the reaction. The discrimination layer typically is very thin and permeable to water, but relatively impermeable to dissolved, dispersed, or suspended solids, such as salts to be removed from saltwater or brackish water in use to produce purified water.

In some embodiments, the amount of salt rejection-enhancing additives that can be used in the aqueous phase is selected to yield a ratio of the concentration of MPD to the concentration of additives in the range of from about 50:1 to about 100:1, with the MPD concentration being from about 2 wt % to about 8 wt % of the polar phase (aqueous phase). In some embodiments, the range of the ratio of concentration of MPD to the concentration of additives is about 50:1, or about 55:1, or about 60:1, or about 65:1, or about 70:1, or about 75:1, or about 80:1, or about 85:1, or about 90:1, or about 95:1, or about 100:1.

The amount of salt rejection-enhancing additives, e.g., biguanide compound, dicarbonate compound, pentathiodicarbonate compound, or salts thereof, can be selected to yield a concentration in the aqueous and/or organic phase of from about 0.001 wt % to about 1 wt %, based on the weight of the aqueous and/or organic phase. In some embodiments, the amount of the biguanide compound, dicarbonate compound, pentathiodicarbonate compound, or salts thereof (e.g., polyhexamethylene biguanide (PHMB) or a PHMB salt, polyhexamethylene dicarbonate or a polyhexamethylene dicarbonate salt, or polyhexamethylene pentathiodicarbonate or a polyhexamethylene pentathiodicarbonate salt) can be selected to yield a concentration in the aqueous and/or organic phase of from about 0.001 wt % to about 0.1 wt %, or from about 0.01 wt % to about 0.1 wt %, or from about 0.05 wt % to about 1 wt %, based on the weight of the aqueous and/or organic phase. In some embodiments, the amount of salt rejection-enhancing additive can be between about 0.001 wt % to about 1 wt %, based on the weight of the aqueous and/or organic phase, e.g., 0.001 wt %, 0.005 wt %, 0.01 wt %, 0.025 wt %, 0.05 wt %, 0.075 wt %, 0.1 wt %, 0.25 wt %, 0.5 wt %, 0.75 wt %, or 1 wt %, based on the weight of the aqueous and/or organic phase.

Processing aids, such as catalysts, surfactants, drying agents, co-reactants, and co-solvents, or any combination thereof also can be present in the aqueous phase or organic phase or both to modify surface properties or further increase performance, for example, to improve fouling resistance. In some embodiments, the processes provided herein include in the aqueous phase: MPD, TEACSA, polyoxyethylene(20) oleyl ether, and a salt rejection-enhancing additive that includes a biguanide compound, dicarbonate compound, pentathiodicarbonate compound, or salts thereof, e.g., PHMB or a PHMB salt, polyhexamethylene dicarbonate or a polyhexamethylene dicarbonate salt, or polyhexamethylene pentathiodicarbonate or a polyhexamethylene pentathiodicarbonate salt.

In some embodiments, a second monomer can be selected so as to be miscible with the non-polar (organic phase) liquid forming a non-polar mixture, although for monomers having sufficient vapor pressure, the monomer optionally can be delivered from a vapor phase. The second monomer optionally also can be selected so as to be immiscible with a polar liquid. Typically, the second monomer can be a dielectrophilic or a polyelectrophilic monomer. The electrophilic monomer can be aromatic in nature and can contain two or more, for example three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability.

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide can be dissolved in the non-polar organic liquid in a range of, for example, from about 0.01 wt % to about 2 wt % polyfunctional acyl halide, preferably from about 0.1 wt % to about 1 wt % polyfunctional acyl halide, such as 0.01 wt %, 0.05 wt %, 0.1 wt %, 0.15 wt %, 0.19 wt %, 0.2 wt %, 0.25 wt %, 0.5 wt %, 0.75 wt %, 1 wt %, 1.25 wt %, 1.5 wt %, 1.75 wt %, or 2 wt % polyfunctional acyl halide, based on the weight of the non-polar mixture. Suitable non-polar liquids include those that are capable of dissolving the electrophilic monomers (e.g., polyfunctional acyl halides) and are immiscible with a polar liquid (e.g., water). Generally, the non-polar organic liquid is a water-immiscible solvent that is inactive in the interfacial polymerization, does not form a chemical bond with the halide compound, and does not damage the porous support layer. Exemplary non-polar organic liquids that can be used to dissolve the acyl halide include aliphatic hydrocarbons, such as $C_8$-$C_{24}$ hydrocarbons and mixtures thereof, such as isoparaffinic solvents such as Isopar™ isoparafinnic fluids (e.g., Isopar™ G petroleum naphtha, low odor, low aromatic $C_{10}$-$C_{12}$ isoalkanes solvent, ExxonMobil, Irving, Tex.) and Isane® isoparaffinic solvents (Total Special Fluids, Oudalle, France). The solvent used can be a single solvent or a mixture of solvents.

Additional non-polar liquids can be included in the organic phase. For example, a non-polar liquid that does not pose a threat to the ozone layer and yet is sufficiently safe in terms of its flashpoint and flammability to undergo routine processing without having to undertake extreme precautions can be selected. These can include $C_5$-$C_7$ hydrocarbons and higher boiling point hydrocarbons and aromatics, i.e., those with boiling points greater than about 90° C., such as $C_8$-$C_{24}$ hydrocarbons and mixtures thereof, which have more suitable flashpoints than their $C_5$-$C_7$ counterparts, but are less volatile. Exemplary non-polar liquids that can be included in the organic phase include trimethyl benzenes, such as 1,2,3-trimethylbenzene, 1,2,4-trimethylbenzene, and 1,3,5-trimethylbenzene (i.e., mesitylene); tetramethylbenzenes, such as 1,2,3,4-tetramethylbenzene, 1,2,4,5-tetramethylbenzene and 1,3,4,5-tetramethylbenzene; pentamethylbenzene, hexamethylbenzene, diisopropylbenzenes, tri-isopropylbenzenes, and tetra-isopropylbenzene. In some embodiments, the organic phase includes a polyfunctional acyl halide and 1,3,5-trimethylbenzene.

The organic phase can include antioxidants. For example, antioxidants for processing and long-term thermal stabilization can be included in the organic phase. Antioxidants can protect the membrane against degradation, for example, from light exposure. Exemplary antioxidants include phenolic primary antioxidants, such as the phenolic primary antioxidant pentaerythritol tetrakis(3-(3,5-di-tert-butyl-4-hydroxyphenyl)propionate), sold as Irganox® 1010. When present, the antioxidant can be dissolved in the organic phase in a range of, for example, from about 0.0025 wt % to 0.05 wt %, or from about 0.005 wt % to 0.025 wt %, or from about 0.01 wt % to about 0.025 wt %.

The non-polar mixture can be applied by dipping, immersing, coating, spraying or any other application technique.

In some embodiments, the polyfunctional acyl halide monomer (also referred to as acid halide) is coated on the porous support layer, typically by application of the organic phase solution. The amine solution can be coated first on the porous support followed by the acyl halide solution. The monomers can react when in contact, thereby polymerizing (i.e., interfacial polymerization) to produce a polymer (e.g., polyamide) matrix discrimination layer at the upper surface of the support layer. Hydrolyzed and non-hydrolyzed polyfunctional acyl halide can be present during interfacial polymerization. As described herein, it is believed that addition of the salt rejection-enhancing additives described herein allows for in situ purification of the polyfunctional acyl halide by forming a complex between the salt rejection-enhancing additive and hydrolyzed polyfunctional acyl halide and removing, i.e., sequestering, the hydrolyzed acyl halide from reaction, thereby reducing the concentration of hydrolyzed acyl halide and increasing the amount of cross-linking and rejection by increasing the concentration of non-hydrolyzed polyfunctional acyl halide available for interfacial polymerization with the salt rejection-enhancing additive. Although one or both of the polyfunctional amine and acyl halide layers can be applied to the porous support layer from a solution, such as by application of the aqueous and organic phases discussed above, they alternatively can be applied by other means, such as by vapor deposition or heat.

In the processes provided herein, the salt rejection-enhancing additive, e.g., a biguanide compound, dicarbonate compound, pentathiodicarbonate compound, or salts thereof, can be added to the aqueous and/or organic phase of the interfacial polymerization process before contact between the phases. By including the salt rejection-enhancing additive in the aqueous and/or organic phase, the additive can sequester, i.e., remove from reaction, hydrolyzed polyfunctional acyl halide in the organic phase, thus preventing hydrolyzed acyl halide from participating in the polymerization reaction and resulting in increased polymerization between non-hydrolyzed polyfunctional acyl halide and the monomer in the aqueous phase. This results in a higher degree of crosslinking and consequently a higher salt rejection through the membrane, such as during reverse osmosis, as compared to membranes prepared in the absence of the salt rejection-enhancing additive. The salt rejection-enhancing additives that include biguanide compounds, dicarbonate compounds, pentathiodicarbonate compounds, or salts thereof, are thought to affect the polymerization reaction and ultimately membrane structure, leading to improved performance. For example, the salt rejection-enhancing additives described herein, e.g., a biguanide compound, dicarbonate compound, pentathiodicarbonate compound, or salts thereof, can purify the polyfunctional acyl halide, e.g., trimesoyl chloride, in situ by forming a complex with hydrolyzed acyl halide, thereby removing, i.e., sequestering, the hydrolyzed acyl halide from reaction and reducing the concentration of hydrolyzed acyl chloride available during the interfacial polymerization reaction, resulting in an increased amount of crosslinking and salt rejection.

It can be advantageous to store the support layer for a period of time, e.g., from 1 minute for up to one hour, before interfacial polymerization on the support layer between aqueous and organic phase solutions. In some embodiments, the discrimination layer can be formed by applying the organic phase solution to the support layer and, after at least 10 seconds, preferably 2 minutes and more preferably 5 minutes after the organic phase solution was applied, applying the aqueous phase to the organic phase solution on the support layer. In some embodiments, the discrimination layer can be formed by applying the aqueous phase to the support layer, allowing it to dry, and then applying the organic phase solution to the dried aqueous phase on the support layer.

Prior to addition to the aqueous phase, the salt rejection-enhancing additive can be subjected to sonic or ultrasonic energy, e.g., from an ultrasonic probe or ultrasonic bath, and/or the aqueous phase can be subjected to sonic or ultrasonic energy just before or during interfacial polymerization. In some applications, an ultrasonic probe can be immersed into the aqueous phase containing the salt rejection-enhancing additive prior to or during interfacial polymerization or both. In some applications, the aqueous phase is subjected to ultrasonic energy for a time from about 1 minute to about 60 minutes prior to interfacial polymerization.

Practice of the invention does not depend critically on the overall shape of the thin film composite membrane. Flat sheet and hollow fiber configurations are two of the possibilities for this overall shape. For flat sheet membranes, a discrimination layer can be on the top surface, the bottom surface, or on both surfaces of the support layer. For hollow fiber membranes, a discrimination layer can be on the inner surface of the support layer, the outer surface of the support layer, or on both inner and outer surfaces of the support layer.

3. Protective Layer

The thin film composite membrane produced by the methods provided herein can be provided with a protective coating layer by coating the surface of the membrane with an aqueous phase of a water-soluble organic polymer in order to protect the membrane surface from damage during the handling of the membrane. Examples of such a water-soluble organic polymer include polymers such as polyethylenimine, polyvinyl alcohol, polyvinyl ether, polyvinylpyrrolidone, polyacrylamide, or polyacrylic acid; copolymers consisting mainly of the monomers constituting these polymers; derivatives of these polymers or copolymers; and mixtures of these compounds.

The surface of the thin film composite membranes produced by the methods provided herein can be coated with an aqueous solution of a sodium salt of citric acid in order to form a protective layer. Examples of such a sodium salt of citric acid include sodium monocitrate, sodium dicitrate, and sodium tricitrate.

The membrane coated with such an aqueous phase of the water-soluble organic polymer generally is subjected to drying. The drying is effected by exposing the coated membrane to temperature of from about 30° C. to about 100° C. for a time of about 1 minute to about 20 minutes. The time required for drying depends on the type of oven used and membrane placement within the oven.

4. Anti-Fouling Layer

Anti-fouling layers can be deposited on either or both surfaces of the thin film composite membrane. An RO membrane can be provided with an anti-fouling capacity by applying a layer capable of forming halamines on the feed stream contact surface of the RO membrane (see, e.g., U.S. Pat. No. 8,567,612). For example, an anti-fouling layer can be formed by depositing a nitrogen-containing polymer solution on the discrimination layer. The polymer can be crosslinked to insolubilize the anti-fouling layer. An intermediate layer can be positioned between the anti-fouling and the discrimination layer so that the thickness and permeability of the anti-fouling and intermediate layer are sufficient to cause halamine formation at the surface of the anti-fouling layer before the discrimination layer is degraded by the halogen. Sufficient nitrogen can be provided in the anti-fouling layer to protect the discrimination layer from fouling by the formation of halamines on the surface of the anti-fouling layer adjacent the feed stream, to permit recharging of the anti-fouling layer by the further addition of halogens thereto to form additional halamines and/or to prevent halogen damage to the discrimination layer by the halogen during operation after multiple recharging.

Other chemistries and techniques for providing an anti-fouling layer, such as treatment with polyethylene oxide to introduce PEG moieties, or using fluorinated polymers or polyacrylonitrile graft copolymers, are known in the art (e.g., see U.S. Pat. Nos. 8,163,814; 8,505,743; 8,505,745; and 8,754,139, the disclosure of each of which is incorporated by reference herein).

E. Modules

The membranes produced using the processes described herein can be spirally wound around a central porous permeate collection tube to produce a semipermeable membrane module for use in a pressure vessel. A typical spirally-wound semipermeable membrane module includes a plurality of leaves that are individual envelopes of sheet-like semipermeable membrane material that sandwich therebetween a layer of porous permeate carrying material, such as polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g., cross-extruded filaments of polypropylene, that provide flow passageways for the feed water being pumped from end to end through the pressure vessel. An appropriate lay-up of such alternating leaves and spacer sheets is then spirally wound about a hollow tube having a porous sidewall to create a right circular cylindrical module. An exemplary spirally-wound separation module is shown in FIG. 1 and in U.S. Pat. No. 4,842,736, the disclosure of which is incorporated herein by reference. The module contains a plurality of spiral feed passageways, through which passageways the feed liquid being treated flows in an axial direction. Internally within the membrane envelopes, the permeating liquid flows along a spiral path inward until it reaches the perforated central tube where it collects and through which it then flows axially to the outlet.

FIG. 1 illustrates an exemplary embodiment of a spiral-wound module. The module includes perforated central tube 1 that collects the filtered fluid. The material of perforated central tube 1 is not limited and can be any material that is resistant to corrosion to the fluid being filtered. In exemplary embodiments, perforated central tube 1 can be made of polyvinyl chloride (PVC). Other materials that also can be used include metals, polymers, ceramics, or combinations thereof. Additional exemplary materials that can be used to form the perforated central tube 1 include plastic materials such as acrylonitrile-butadiene-styrene, polysulfone, poly (phenylene oxide), polystyrene, polypropylene, polyethylene or the like. The size and arrangement of the perforations can be arranged in any manner desirable as long as they allow for the filtered fluid to flow into the perforated central tube 1. Wound around perforated central tube 1 is a set of leaves composed of folded permeable membrane sheets 2, feed channel spacers 3, and permeate collection sheet 4. Around the outside of the module is a shell 5 and an anti-telescoping device 6, located at each end of the module.

Modules containing membranes produced using the processes described herein can be used to produce a stream of potable water from seawater at pressure conditions of not greater than about 800 psi and brackish water at pressure conditions of not greater than about 225 psi. The membranes and processes described herein also can be used to purify tap water.

F. Membrane Characteristics

In preferred embodiments, the salt rejection characteristics of membranes produced using the salt rejection-enhancing additives described herein are improved as compared to membranes prepared in the absence of the additives. In preferred embodiments, the membrane B-value (also referred to as the salt permeability coefficient), which is a measure of the flow of ions through the membrane, is less than about $3.0 \times 10^{-8}$, such as less than about $2.5 \times 10^{-8}$, or less than about $2 \times 10^{-8}$, such as about $1.9 \times 10^{-8}$ or less, e.g., less than about $3 \times 10^{-8}$, $2.9 \times 10^{-8}$, $2.8 \times 10^{-8}$, $2.7 \times 10^{-8}$, $2.6 \times 10^{-8}$, $2.5 \times 10^{-8}$, $2.4 \times 10^{-8}$, $2.3 \times 10^{-8}$, $2.2 \times 10^{-8}$, $2.1 \times 10^{-8}$, $2 \times 10^{-8}$, $1.9 \times 10^{-8}$, $1.8 \times 10^{-8}$, $1.7 \times 10^{-8}$, $1.6 \times 10^{-8}$, $1.5 \times 10^{-8}$, or less. The total dissolved solids (TDS) rejection, or salt rejection, which is a measure of the combined content of all inorganic and organic substances in the water, is typically at least about 99.8%, such as about 99.8%, 99.81%, 99.82%, 99.83%, 99.84%, 99.85%, 99.86%, 99.87%, 99.88%, 99.89%, 99.9%, 99.91%, 99.92%, 99.93%, 99.94%, 99.95%, 99.96%, 99.97%, 99.98%, or 99.99%.

B-value and TDS (salt) rejection can be determined initially, for example, after production of the TFC membrane, but before operation, and can be determined after operation of the TFC membrane for a period of time, such as, for example, 1 week, 2 weeks, 3 weeks, 4 weeks, or more. The TFC membranes described herein that incorporate a salt rejection-enhancing additive in the aqueous and/or organic phase of the interfacial polymerization reaction to form a TFC membrane can exhibit low B-values and high salt rejection values after operation of the TFC membrane for a period of time, such as 1 week, 2 weeks, 3 weeks, 4 weeks, or more, as compared to similar membranes prepared in the absence of the salt rejection-enhancing additive.

Total solids rejection (R, in %) can be calculated using the following equation:

$$R(\%) = \left(1 - \frac{C_p}{C_f}\right) \times 100$$

where $C_f$ is the concentration of TDS in the feed water and $C_p$ is the concentration of TDS in the permeate, both of which can be measured using a calibrated conductivity meter.

The B-value, or salt permeability coefficient, is a measurement of the flow of salt through a membrane. B-value can be determined using the following equation, where the lower the B-value, the less dissolved salts, minerals and ions pass through the membrane:

$$B = N_A / (C_{fc} - C_p)$$

where $N_A$ is the salt flux and is proportional to the salt concentration difference between both sides of the membrane. $C_{fc}$ represents the feed-concentrate average salt concentration and $C_p$ represents the permeate salt concentration.

G. Examples

Preparation and Testing of Thin Film Composite Membranes

Thin film composite (TFC) membranes were prepared by interfacial polymerization and were tested for flux, salt rejection, and permeability properties. The membranes were prepared with either a salt rejection-enhancing additive (polyhexamethylene biguanide (PHMB)) or a flux-enhancing additive ($Sr(F_6acac)_2$), or both, or without any additive.

The membranes were prepared using the following general procedure. An aqueous solution containing the aqueous phase components was prepared and applied to a polyester nonwoven reinforced polysulfone support. After droplets from the surface were removed, an organic solution containing the organic phase components was applied. The membrane was dried in an oven with the web reaching a temperature of 95° C. and residual chemicals were subsequently extracted in hot water (60° C.).

Components of the aqueous phase included: 4% of a polyamine, m-phenylenediamine (MPD; DuPont, Wilmington, Del.); 4.5% of a drying agent, triethylamine camphorsulfonic acid (TEACSA; Sunland Chemical and Research, Los Angeles, Calif.); 0.1% of the nonionic surfactant Brij™ 98; either 0% or 0.05% of the biguanide compound PHMB (20 wt % aqueous solution; Arch Chemicals, Norwalk, Conn.); either 0%, 0.25%, or 0.05% of a metal chelate additive, $Sr(F_6acac)_2$; and a polar solvent, water.

Components of the organic phase included: 4% of a polyfunctional acid halide, trimesoyl chloride (TMC; Sigma Aldrich, St. Louis, Mo.); 0.19% of a non-polar liquid, 1,3,5-trimethylbenzene (TMB, mesitylene; Sigma Aldrich, St. Louis, Mo.); and an isoparafinnic solvent, Isopar™ G (a low odor, low aromatic hydrocarbon solvent from Exxon-Mobile Chemical Company, Houston, Tex.).

The salt rejection, flux, and permeability (B-value) of each of the TFC membranes were tested with a solution of NaCl (32,000 ppm) in water at 800 psi and 25° C. Volume and time measurements were taken in a graduated cylinder and flux was determined using the following equation:

$$\text{Flux }(gfd) = \frac{\text{permeate (gallons)}}{\text{membrane area }(ft^2) \cdot \text{time (day)}}.$$

Salt rejection was measured from the same volume of permeate collected for flux measurements and was measured with a conductivity meter. Results are shown in Table 1, below, with standard deviation values listed in parentheses.

TABLE 1

Flux, rejection, and permeability values of TFC membranes

| Membrane | PHMB (%) | Sr(F$_6$acac)$_2$ (%) | Rejection (%) | B-value (m/s) | Flux (gfd) |
|---|---|---|---|---|---|
| 1 | 0 | 0 | 99.78 (0.04) | 3.04 × 10$^{-8}$ (6.07 × 10$^{-9}$) | 23.52 (1.01) |
| 2 | 0 | 0.025 | 99.77 (0.01) | 3.23 × 10$^{-8}$ (3.23 × 10$^{-9}$) | 24.04 (1.33) |
| 3 | 0 | 0.05 | 99.69 (0.07) | 4.61 × 10$^{-8}$ (8.57 × 10$^{-9}$) | 25.38 (0.89) |
| 4 | 0.05 | 0 | 99.80 (0.06) | 1.87 × 10$^{-8}$ (4.46 × 10$^{-9}$) | 15.70 (0.87) |
| 5 | 0.05 | 0.025 | 99.79 (0.01) | 2.78 × 10$^{-8}$ (1.47 × 10$^{-9}$) | 22.67 (0.42) |
| 6 | 0.05 | 0.05 | 99.70 (0.13) | 3.70 × 10$^{-8}$ (1.66 × 10$^{-8}$) | 20.39 (0.87) |

As shown in Table 1, the membrane (Membrane 4) that was prepared with 0.05% of the salt rejection-enhancing additive PHMB and no flux-enhancing additive Sr(F$_6$acac)$_2$ exhibited slightly higher salt rejection and a 38.5% decrease in permeability (B-value), along with a decrease in flux, as compared to the membrane (Membrane 1) prepared in the absence of either additive (PHMB and Sr(F$_6$acac)$_2$). Membranes prepared with the flux-enhancing additive Sr(F$_6$acac)$_2$ and no salt rejection-enhancing additive PHMB (Membranes 2 and 3) exhibited slightly lower rejection values and increased B-values, but slightly increased flux values, as compared to Membrane 1. Membranes 5 and 6 were prepared with both the salt rejection-enhancing additive PHMB and the flux-enhancing additive Sr(F$_6$acac)$_2$. Membrane 5, prepared with 0.05% PHMB and 0.025% Sr(F$_6$acac)$_2$ exhibited only a slightly increased flux as compared to Membrane 1 and an 8.55% decrease in B-value. While the flux was only slightly decreased as compared to Membrane 1, the B-value was not as low as the B-value exhibited by Membrane 4 which was prepared with only the rejection-enhancing additive PHMB. Membrane 6, which was prepared with 0.05% PHMB and 0.05% Sr(F$_6$acac)$_2$, exhibited lower rejection and higher permeability as compared to membrane 1, and also a decrease in flux. As Table 1 shows, Membrane 4, the membrane prepared with only the salt rejection-enhancing additive PHMB, exhibited the greatest decrease in permeability (B-value) as compared to membranes prepared with both a salt rejection-enhancing additive and a flux-enhancing additive or with neither additive.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A process for preparing a thin film composite membrane, comprising:
   providing an aqueous phase comprising a polyamine and an organic phase comprising a polyfunctional acyl halide;
   introducing a salt rejection-enhancing additive in the aqueous phase, the salt rejection-enhancing additive able to form a complex with hydrolyzed polyfunctional acyl halide;
   applying the aqueous phase to a surface of a porous support membrane to form a coated support membrane;
   applying the organic phase to the coated support membrane to allow interfacial polymerization between the aqueous phase and organic phase, wherein hydrolyzed and non-hydrolyzed polyfunctional acyl halide are present during interfacial polymerization;
   forming a complex between the salt rejection-enhancing additive and the hydrolyzed polyfunctional acyl halide and interfacially polymerizing the polyamine and the non-hydrolyzed acyl halide to produce a discrimination layer of a thin film composite membrane comprising the porous support membrane and the discrimination layer, wherein the thin film composite membrane exhibits a salt rejection that is greater than the salt rejection of a thin film composite membrane prepared in the absence of the salt rejection-enhancing additive or a permeability coefficient (B-value) that is less than the permeability coefficient of a thin film composite membrane prepared in the absence of the salt rejection-enhancing additive,
   wherein the salt rejection-enhancing additive has the formula:

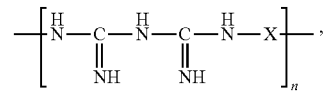

or a salt thereof, wherein:
   n is a number between 10 and 15; and
   X is an alkyl chain having between 4 and 8 carbons; and
   wherein the aqueous phase or the organic phase or both comprises a phosphoramide as an additive.

2. The process of claim 1, wherein during the interfacial polymerization, the salt rejection-enhancing additive complexes with all hydrolyzed polyfunctional acyl halide present in the organic phase applied to the coated support membrane.

3. The process of claim 1, wherein X is an alkyl chain having 6 carbons and is —(CH$_2$)$_6$—.

4. The process of claim 1, wherein the concentration of salt rejection-enhancing additive in the aqueous phase is from about 0.001% to 1% based on the weight of the aqueous phase.

5. The process of claim 1, wherein the polyfunctional acyl halide is selected from among trimesoyl chloride, trimellitic acid chloride, isophthaloyl chloride, and terephthaloyl chloride.

6. The process of claim 1, wherein the amount of polyfunctional acyl halide in the organic phase is from about 0.01% to about 2%, based on the weight of the organic phase.

7. The process of claim 1, wherein the hydrolyzed polyfunctional acyl halide is mono-hydrolyzed or di-hydrolyzed.

8. The process of claim 1, wherein the polyamine is selected from among diaminobenzene, triaminobenzene, m-phenylenediamine, p-phenylenediamine, 1,3,5-diaminobenzoic acid, 2,4-diaminotoluene, 2,4-diaminoanisole, xylylenediamine, ethylenediamine, propylenediamine, piperazine, and tris(2-diaminoethyl)amine.

9. The process of claim 1, wherein the amount of polyamine in the aqueous phase is from about 0.1% to about 10%, based on the weight of the aqueous phase.

10. The process of claim 1, further comprising adding a processing aid selected from among a surfactant, a co-solvent, a drying agent, a catalyst, or any combination thereof to the aqueous phase or organic phase or both prior to applying the aqueous phase or organic phase to the porous support membrane.

11. The process of claim 10, wherein the surfactant is selected from among sodium lauryl sulfate (SLS), an alkyl poly(ethylene oxide), an octylphenol ethoxylate, an ethoxylated nonylphenol, and combinations thereof.

12. The process of claim 10, wherein the drying agent is selected from among a hydrocarbon or an ether, glycerin, citric acid, glycols, glucose, sucrose, triethylammonium camphorsulfonate, triethylammonium benzenesulfonate, triethylammonium toluenesulfonate, triethylammonium methane sulfonate, ammonium camphor sulfonate, and ammonium benzene sulfonate.

13. The process of claim 1, wherein the thin film composite membrane is a reverse osmosis membrane.

14. A thin film composite membrane prepared according to the process of claim 1.

15. The reverse osmosis membrane of claim 14, wherein:
   the membrane exhibits a total solids rejection of between 99.8% and 99.99%, when the membrane is exposed to deionized water containing 32,000 ppm NaCl at a temperature of 25° C. and a pressure of 800 psi; or
   the membrane exhibits a permeability coefficient (B-value) of less than $3 \times 10^8$, when the membrane is exposed to deionized water containing 32,000 ppm NaCl at a temperature of 25° C. and a pressure of 800 psi.

* * * * *

UNITED STATES PATENT AND TRADEMARK OFFICE
CERTIFICATE OF CORRECTION

PATENT NO. : 9,861,940 B2  
APPLICATION NO. : 14/841223  
DATED : January 9, 2018  
INVENTOR(S) : Jeff Koehler et al.

Page 1 of 1

It is certified that error appears in the above-identified patent and that said Letters Patent is hereby corrected as shown below:

On the Title Page

In Item (73) Assignee, 1st Column, please replace "LG BABOH2O, INC." with —LG NANOH2O, INC.—

Signed and Sealed this  
Eighth Day of May, 2018

Andrei Iancu  
*Director of the United States Patent and Trademark Office*